(12) United States Patent
Penny et al.

(10) Patent No.: US 12,013,076 B1
(45) Date of Patent: Jun. 18, 2024

(54) ADJUSTABLE SECURITY BRACKETS

(71) Applicant: OnQ Solutions, Inc., Hayward, CA (US)

(72) Inventors: Steven D. Penny, Oakland, CA (US); Sean A. Naderzad, San Jose, CA (US)

(73) Assignee: OnQ Solutions, Inc., Hayward, CA (US)

( * ) Notice: Subject to any disclaimer, the term of this patent is extended or adjusted under 35 U.S.C. 154(b) by 11 days.

(21) Appl. No.: 18/172,084

(22) Filed: Feb. 21, 2023

(51) Int. Cl.
| | | |
|---|---|---|
| A47F 7/024 | (2006.01) | |
| E05B 73/00 | (2006.01) | |
| F16M 11/04 | (2006.01) | |
| F16M 13/00 | (2006.01) | |
| G08B 13/14 | (2006.01) | |
| B60R 11/00 | (2006.01) | |
| B60R 11/02 | (2006.01) | |

(52) U.S. Cl.
CPC ........... F16M 11/041 (2013.01); A47F 7/024 (2013.01); B60R 2011/008 (2013.01); B60R 11/0241 (2013.01); E05B 73/00 (2013.01); G08B 13/14 (2013.01)

(58) Field of Classification Search
CPC ..... F16M 11/041; A47F 7/024; B60R 11/024; B60R 2011/0096; B60R 2011/008; B60R 2011/0085; B40R 11/0241; E05B 73/00; G08B 13/14
See application file for complete search history.

(56) References Cited

U.S. PATENT DOCUMENTS

| | | | |
|---|---|---|---|
| 6,831,560 B2 | 12/2004 | Gresset | |
| 10,165,873 B2 * | 1/2019 | Gulick, Jr. | ............ A47F 7/0246 |
| 10,394,297 B1 | 8/2019 | Han | |
| 11,714,454 B1 * | 8/2023 | Wu | ........................ G02B 7/002 |
| | | | 361/679.03 |
| 2017/0049251 A1 * | 2/2017 | Gulick, Jr. | ............ F16M 13/00 |
| (Continued) | | | |

FOREIGN PATENT DOCUMENTS

WO    WO-2021011625 A1 *    1/2021    ......... E05B 73/0082

OTHER PUBLICATIONS

InVue, "Wearables Solutions: Complete display security solutions for wearables," invue.com, Aug. 6, 2019, 4 pages.

(Continued)

*Primary Examiner* — Tan Le

(74) *Attorney, Agent, or Firm* — Vierra Magen Marcus LLP

(57) ABSTRACT

Adjustable security brackets adapted to selectively secure different sized portable devices to a display surface are described herein. Such a security bracket includes a main body selectively securable to the display surface, first and second arm assemblies, a drivetrain, first and second actuators, a back support, and a rotatable shaft. The arm assemblies each include a respective pair of arms between which a portable device can be secured. The drivetrain is mechanically coupled to the first and second arm assemblies. The first actuator is configured to actuate the drivetrain to cause the first and second arm assemblies to move toward and away from one another. The rotatable shaft is mechanically coupled to the back support. The second actuator is configured to rotate the rotatable shaft in first and second rotational directions to cause the back support to move up and down relative to the main body.

21 Claims, 16 Drawing Sheets

(56) References Cited

U.S. PATENT DOCUMENTS

2018/0295733 A1\* 10/2018 Wen .................. G02C 3/003
2018/0342136 A1 11/2018 Hartweg et al.
2019/0178010 A1\* 6/2019 Moock ................ G06F 1/1632
2021/0001782 A1\* 1/2021 Liu .................. B60R 11/0241
2021/0228000 A1\* 7/2021 Schuft ................ E05B 73/0017
2023/0407683 A1\* 12/2023 Penny ................ A47F 7/0246

OTHER PUBLICATIONS

MTI, "Freedom Micro FlexTech," Brochure, www.MTIGS.com, Oct. 2019, 3 pages.
Scorpion Security Products, "Smartwatch Scorpion: Apple Watch," Brochure, www.scorpionsp.com, Nov. 2019, 1 page.
Scorpion Security Products, "Smartwatch Scorpion: Garmin," Brochure, www.scorpionsp.com, Nov. 2019, 1 page.
Scorpion Security Products, "Smartwatch Scorpion: Gizmo," Brochure, www.scorpionsp.com, Nov. 2019, 1 page.
Scorpion Security Products, "Smartwatch Scorpion: Samsung Galaxy Active2," Brochure, www.scorpionsp.com, Nov. 2019, 1 page.
Scorpion Security Products, "Smartwatch Scorpion: Samsung," Brochure, www.scorpionsp.com, Nov. 2019, 1 page.

\* cited by examiner

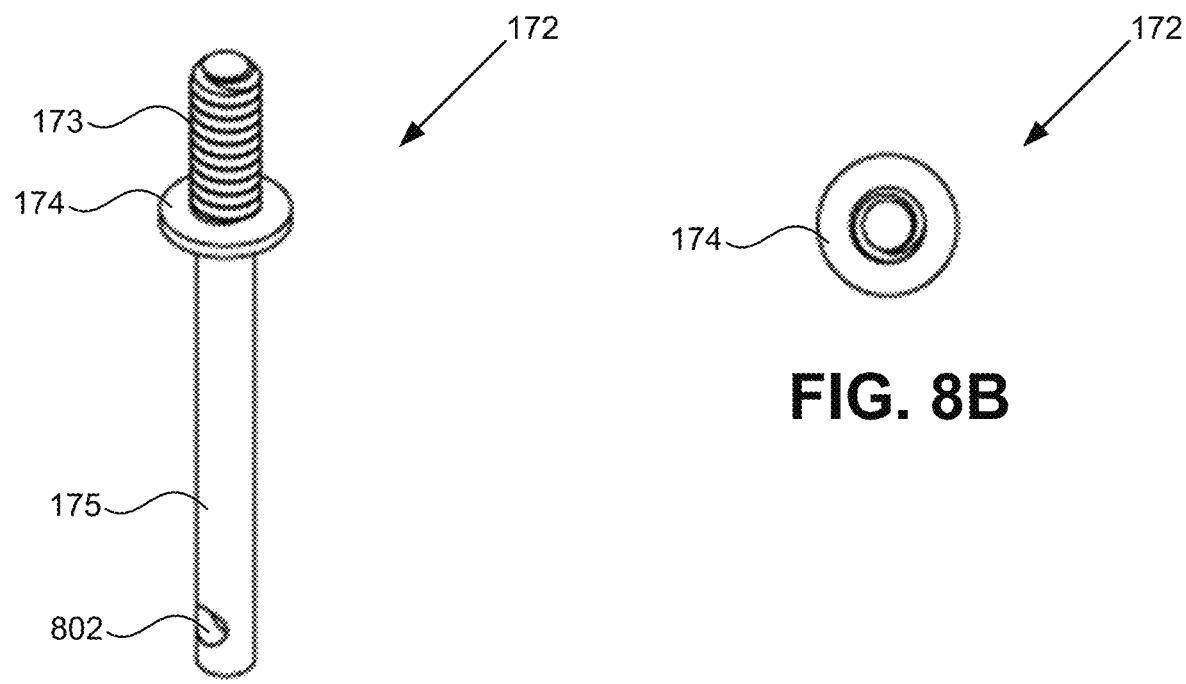
FIG. 8A
FIG. 8B
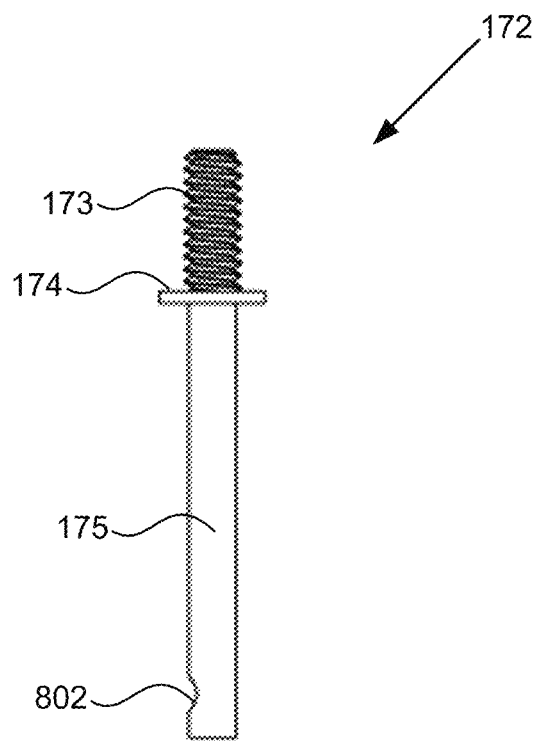
FIG. 8C
FIG. 8D

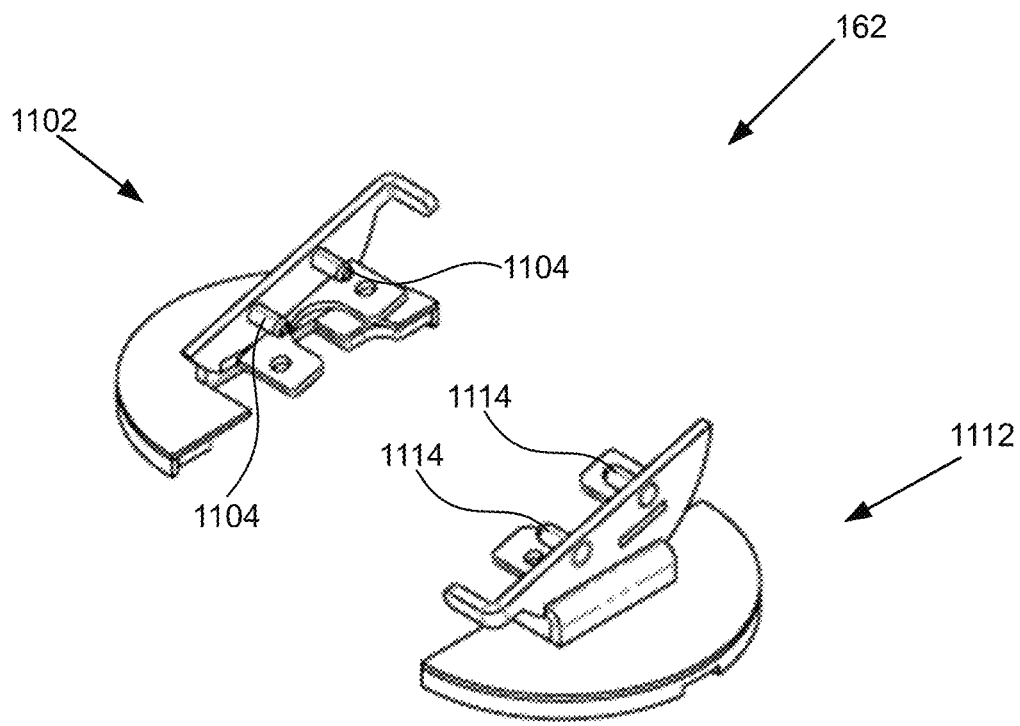
FIG. 11
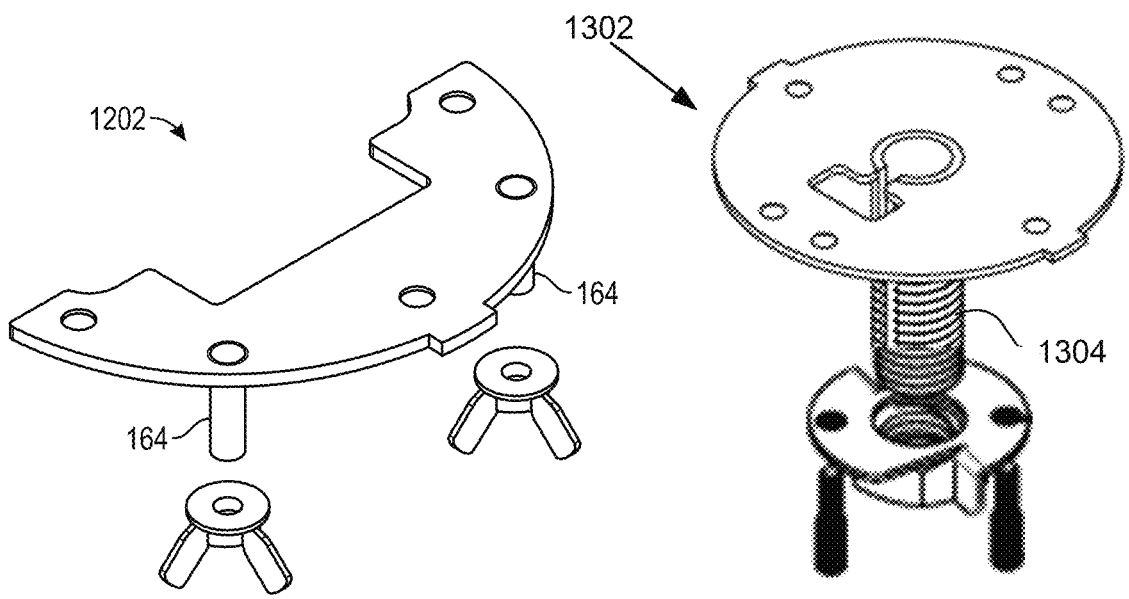
FIG. 12  FIG. 13

ADJUSTABLE SECURITY BRACKETS

FIELD OF TECHNOLOGY

Embodiments of the present technology relate to apparatuses that physically secure portable devices, such as smartwatches and other wrist-worn wearables, to tabletops of display tables or to other display surfaces.

BACKGROUND

Portable devices, such as conventional wristwatches, smartwatches, fitness trackers and other wrist-worn wearables, are often sold in retail stores. Such device may have a relatively high value for their size (e.g., several hundred dollars for devices that may be pocket sized), are easily moved (portable), and may therefore be attractive targets for thieves.

To enable customers to view, touch, and interface with portable devices in a retail store, the portable devices are often displayed on a tabletop of a display table. The portable devices are often secured to the display table to prevent theft. For example, a portable device can be physically secured to a table using a cable or a security mount. Such security mounts, which are also known as security brackets, may be customized for a specific size of a specific portable device. It often takes a few weeks to a few months lead-time for a security mount manufacturer to design, build, and distribute a new customized security mount that is suitable for securing a portable device to a display table. It is typically the case that whenever a new model of a portable device (e.g., a smartwatch) is released, the size (i.e., dimensions) of the electronic device is changed compared to the previous model. Accordingly, it is typically the case that whenever a new model of a portable device is released, a new customized security mount (that is suitable for securing the portable device to a display surface) is not available to retail stores for at least a few weeks, and potentially up to a few months. This leads to a retail store needing to order new security mounts each time a new model of a specific portable device is released. Where a retail store sells multiple different models of multiple portable devices, each year that store may need to buy numerous new security mounts, which can be very costly and can thus significantly increase the overhead of the retail store.

SUMMARY

Certain embodiments of the present technology are directed to adjustable security brackets that are adapted to selectively secure any one of a plurality of different sized portable devices to a display surface. The portable devices can be, e.g., conventional wristwatches, smartwatches, fitness trackers and other wrist-worn wearables, but are not limited thereto. The display surface can be, e.g., a tabletop of a display table or to another display surface, such as a display shelf or a display wall, but is not limited thereto. Where the portable device includes a rechargeable battery, the adjustable security bracket can also be used to secure a charger adjacent to (e.g., underneath) the portable device, so that the battery of the portable device can be charged while the portable device is secured within the adjustable security bracket and being displayed to potential consumers.

In accordance with certain embodiments, an adjustable security bracket comprises a main body, a drivetrain, an actuator, and first and second arm assemblies. The main body is selectively securable to the display surface, and at least a portion of the drivetrain is located within the main body. The actuator is attached to and configured to rotate a driveshaft of the drivetrain. Each of the first and second arm assemblies includes a respective pair of arms between which a portable device can be secured to the adjustable security bracket when the portable device is placed between the first and second arm assemblies and the first and second arm assemblies are moved toward one another. The first and second arm assemblies are mechanically coupled to the drivetrain such that the first and second arm assemblies move toward one another in response to the actuator being used to rotate the driveshaft of the drivetrain in a first rotational direction, and the first and second arm assemblies move away from one another in response to the actuator being used to rotate the driveshaft of the drivetrain in a second rotational direction that is opposite the first rotational direction.

In accordance with certain embodiments, the driveshaft to which the actuator is attached comprises a first driveshaft, and the drivetrain further includes second and third driveshafts that are mechanically coupled to the first driveshaft such that rotation of the first driveshaft using the actuator also causes rotation of the second and third driveshafts.

In accordance with certain embodiments, the first driveshaft includes a first bevel gear, the second driveshaft includes a second bevel gear, and the third driveshaft includes a third bevel gear. The second and third driveshafts are axially aligned with one another and are each perpendicular to the first driveshaft. The first bevel gear of the first driveshaft intermeshes with both the second bevel gear of the second driveshaft and the third bevel gear of the third driveshaft.

In accordance with certain embodiments, the first arm assembly comprises a first pedestal including a first internally threaded bore, and the second arm assembly comprises a second pedestal including a second internally threaded bore that is axially aligned with the first internally threaded bore. The first driveshaft includes a first externally threaded portion positioned within the first internally threaded bore of the first pedestal of the first arm assembly such that rotation of the first driveshaft causes the first arm assembly to move relative to the main body. Similarly, the second driveshaft includes a second externally threaded portion that is positioned within the second internally threaded bore of the second pedestal of the second arm assembly such that rotation of the second driveshaft causes the second arm assembly to move relative to the main body.

In accordance with certain embodiments, rotation of the actuator in the first rotational direction causes the first driveshaft to rotate in the first rotational direction, which causes one of the second and third driveshafts to rotate in the first rotational direction, and causes the other one of the second and third driveshafts to rotate in the second rotational direction, thereby causing the first and second arm assemblies to move toward one another; and rotation of the actuator in the second rotational direction causes the first driveshaft to rotate in the second rotational direction, which causes the one of the second and third driveshafts to rotate in the second rotational direction, and causes the other one of the second and third driveshafts to rotate in the first rotational direction, thereby causing the first and second arm assemblies to move away from one another.

In accordance with certain embodiments, the actuator comprises a thumbscrew that is accessible from below the main body when the main body is not secured to the display surface, and is inaccessible when the main body is secured to the display surface.

In accordance with certain embodiments, each of the first and second arm assemblies includes a respective lower arm assembly and a respective upper arm assembly. In certain such embodiments, the first pedestal is part of the lower arm assembly of the first arm assembly, and the second pedestal is part of the lower arm assembly of the second arm assembly. The upper arm assembly of each of the first and second arm assemblies is configured to be selectively attached to the lower arm assembly of a respective one of the first and second arm assemblies, and is configured to be selectively removable and replaceable with a differently sized upper arm assembly while the adjustable security bracket is not securing a portable device to the adjustable security bracket. However, the upper arm assembly of each of the first and second arm assemblies cannot be removed from the respective lower arm assembly thereof while the adjustable security bracket is securing a portable device to the adjustable security bracket.

In accordance with certain embodiments, the lower arm assembly of each of the first and second arm assemblies includes a respective dovetail tongue. The upper arm assembly of each of the first and second arm assemblies includes a respective dovetail channel that is configured to accept the dovetail tongue of one of the lower arm assemblies to thereby enable the upper arm assembly of each of the first and second arm assemblies to be selectively attached to and removed from the lower arm assembly of each of the first and second arm assemblies while the adjustable security bracket is not securing a portable device to the adjustable security bracket.

In accordance with certain embodiments, the adjustable security bracket further comprises a rotatable shaft including a lower portion thereof that extends through a longitudinal bore of the first driveshaft, and including an externally threaded upper portion that extends above the longitudinal bore of the first driveshaft. The adjustable security bracket also comprises a further actuator and a back support. The rotatable shaft is mechanically coupled to the back support. The further actuator is attached to the lower portion of the rotatable shaft and configured to rotate the rotatable shaft. The back support has an upper surface below which is located a support body including an internally threaded bore. The externally threaded upper portion of the rotatable shaft is positioned within the internally threaded bore of the support body of the back support such that rotation of the rotatable shaft using the further actuator causes the back support to move upwards away from, or downwards towards, the main body so that portable devices of various different thicknesses can be secured to the adjustable security bracket.

In accordance with certain embodiments, the back support is configured to push a portable device upward against braces of the pairs of arms of the first and second arm assemblies to further secure the said portable device to the adjustable security bracket.

In accordance with certain embodiments, rotation of the further actuator in one of the first and second rotational directions causes the back support to move upwards away from the main body, and rotation of the further actuator in the other one of the first and second rotational directions causes the back support to move downwards towards the main body.

In accordance with certain embodiments, the actuator comprises a first thumbscrew and the further actuator comprises a second thumbscrew that is axially aligned with the first thumbscrew. In certain such embodiments, the first and second thumbscrews are accessible from below the main body when the main body is not secured to a display surface, and are inaccessible when the main body is secured to a display surface. More generally, the actuators are accessible from below the main body when the main body is not secured to a display surface, and are inaccessible when the main body is secured to a display surface.

In accordance with certain embodiments, the adjustable security bracket further comprises a base assembly that is attached to or configured to be attached to the main body. One or more fasteners extending from the base assembly is/are configured to secure the base assembly, and the main body attached thereto, to the display surface.

In accordance with certain embodiments, movement of the first and second arm assemblies enables portable devices of various different lengths and diameters to be secured between arms of the first and second arm assemblies, and movement of the back support enables portable devices of various different thicknesses to be secured between the back support and braces of the arms of the first and second arm assemblies. Movement of the back support also enables a charger to be secured adjacent to (e.g., underneath) a portable device, between the portable device and the back support.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 8A-8D illustrate a rotatable shaft of the adjustable security bracket, which rotatable shaft is used to move the back support shown in FIGS. 5A-5E, according to an embodiment of the present technology.

FIG. 11 illustrates portions of a base assembly of the adjustable security bracket, according to an embodiment of the present technology.

FIG. 12 illustrates a fastener assembly, according to an embodiment of the present technology.

FIG. 13 illustrates a fastener assembly, according to another embodiment of the present technology.

DETAILED DESCRIPTION

Embodiments of the present technology generally relate to adjustable security brackets that can be used to physically secure a range of portable devices (e.g., with different physical dimensions) to tabletops of display tables or to other display surfaces. The benefits, features, and advantages of the various embodiments of the present technology will become better understood with regard to the following description and accompanying drawings. The following description is presented to enable one of ordinary skill in the art to make and use embodiments of the present technology as provided within the context of a particular application and its requirements. Various modifications to the embodiments described herein will, however, be apparent to one skilled in the art, and the general principles defined herein may be applied to other embodiments. Therefore, the embodiments of the present invention are not intended to be limited to the particular embodiments shown and described herein but are to be accorded the widest scope consistent with the principles and novel features herein disclosed.

Figure 1A:
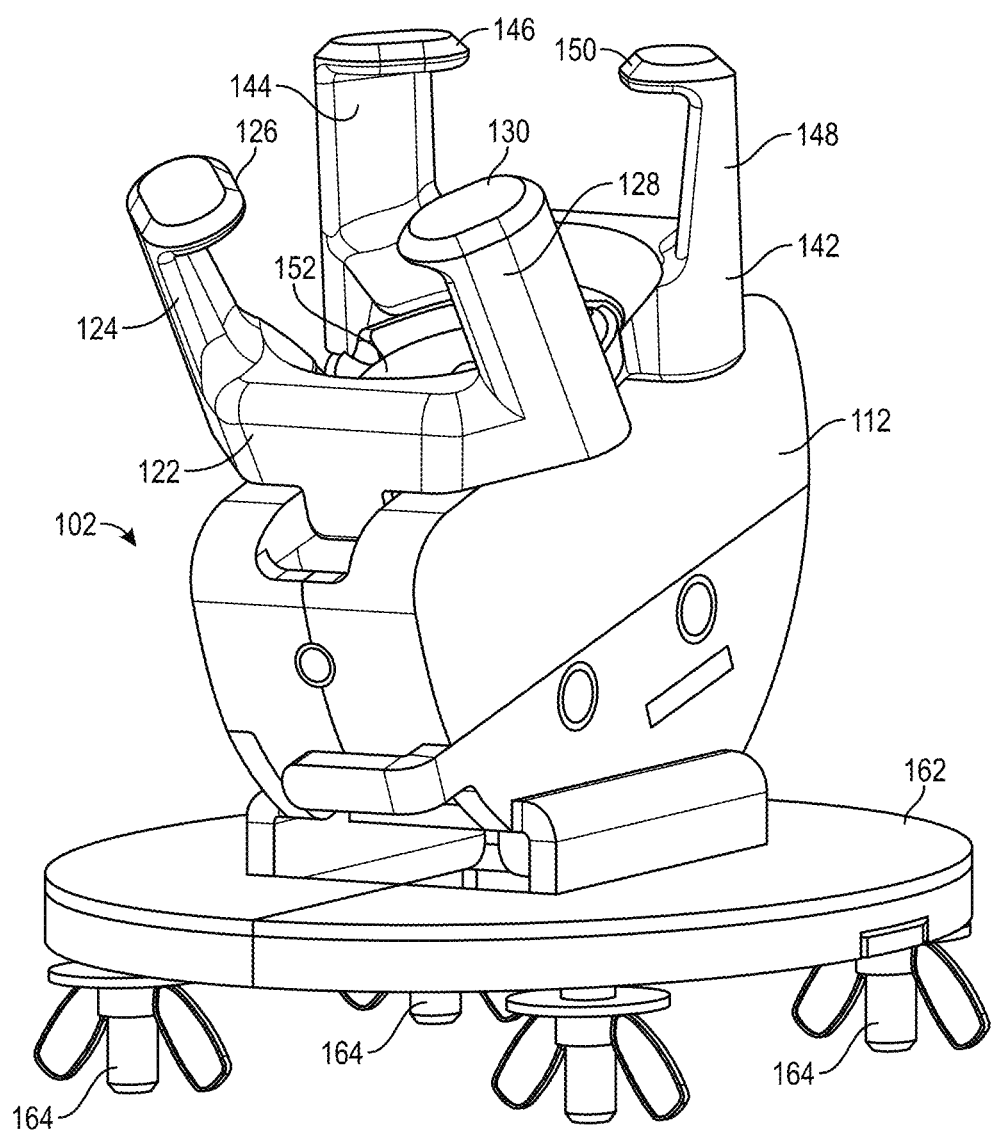
FIGS. 1A-G illustrate an adjustable security bracket, according to an embodiment of the present technology.
Figure 1B:
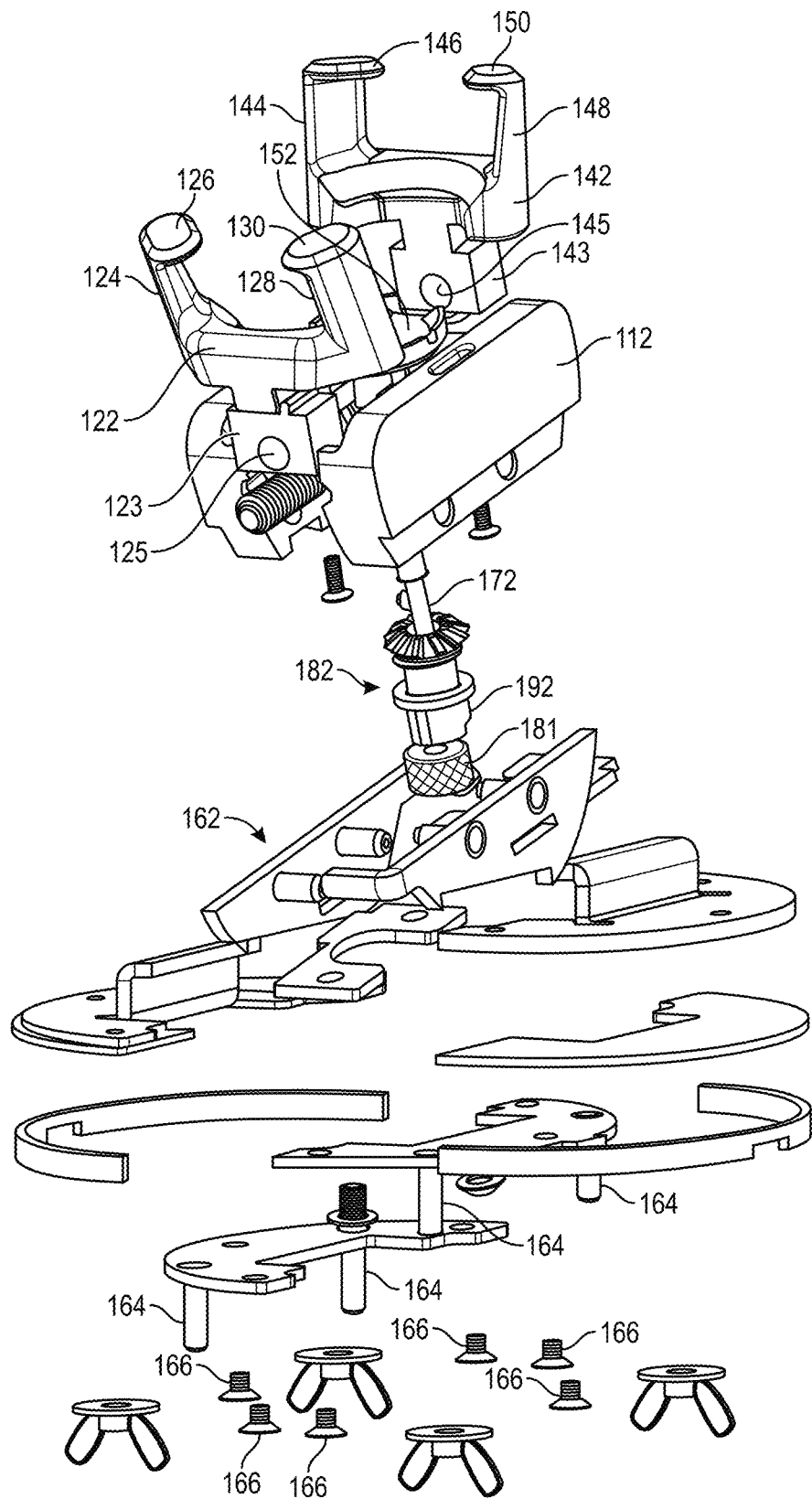

FIGS. 1A and 1B are, respectively, perspective and exploded views of an adjustable security bracket 102, according to an embodiment of the present technology. The adjustable security bracket 102 can also be referred to as an adjustable security mount, or more succinctly as a security bracket or security mount, or even more succinctly as a bracket or mount. The adjustable security bracket 102 is shown as including a main body 112, first and second arm assemblies 122 and 142, a back support 152, and a base assembly 162. A plurality of fasteners 164 (four bolts with wingnuts in the example of FIG. 1A) are shown as extending downward from the base assembly 162. The fasteners 164 are attachable to a display surface (e.g., a tabletop of a display table or to another display surface, such as a display wall) to thereby secure the security bracket 102 and portable device (e.g., a smartwatch) to the display surface. As will be described in additional detail below, one or more alternative types of fasteners can be used in place of the four bolts with wingnuts to attach the security bracket 102 to a display surface. The wingnuts may be tightened to secure the adjustable security bracket to a tabletop or other type of display surface, from the underside of the tabletop or the backside of some other type of display surface that is not accessible to potential customers visiting a retail store. The underside of such a tabletop or backside of another type of display surface may be inaccessible (e.g., by being behind or within a locked cabinet) to people visiting a retail store when the adjustable security bracket 102 is attached to the tabletop or other type of display surface.

The various components of the adjustable security bracket 102 are preferably made of a strong material, such as a metal (e.g., steel) or an alloy, but not limited thereto, so as to prevent the adjustable security bracket 102 from being broken or otherwise pried open by a thief.

Figure 1C:
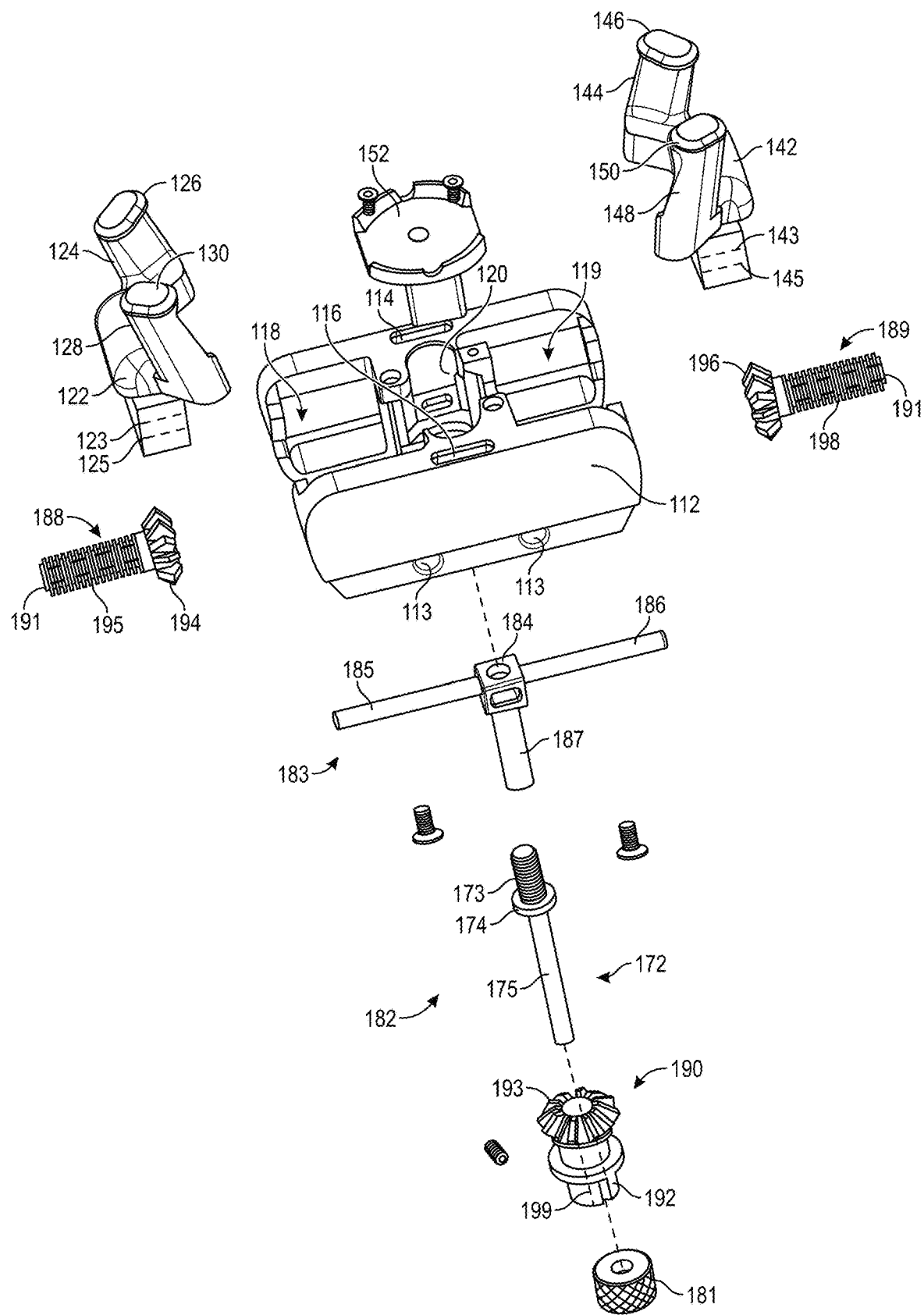
Figure 1D:
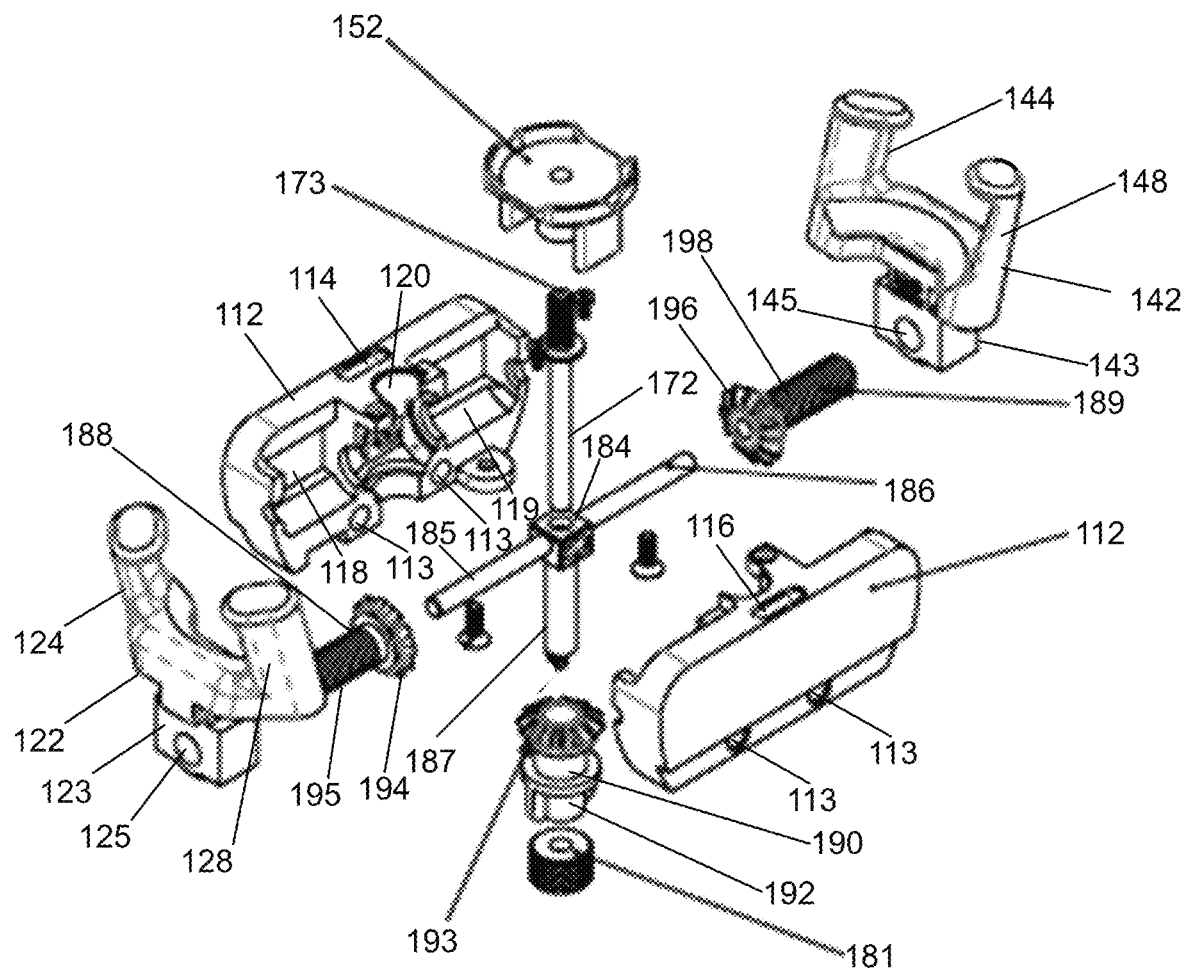
Figure 1E:
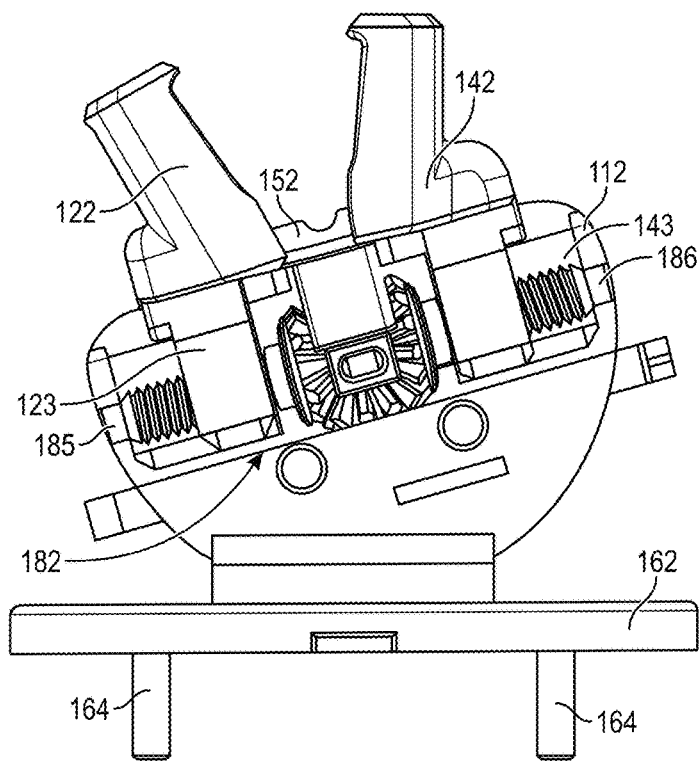
Figure 1F:
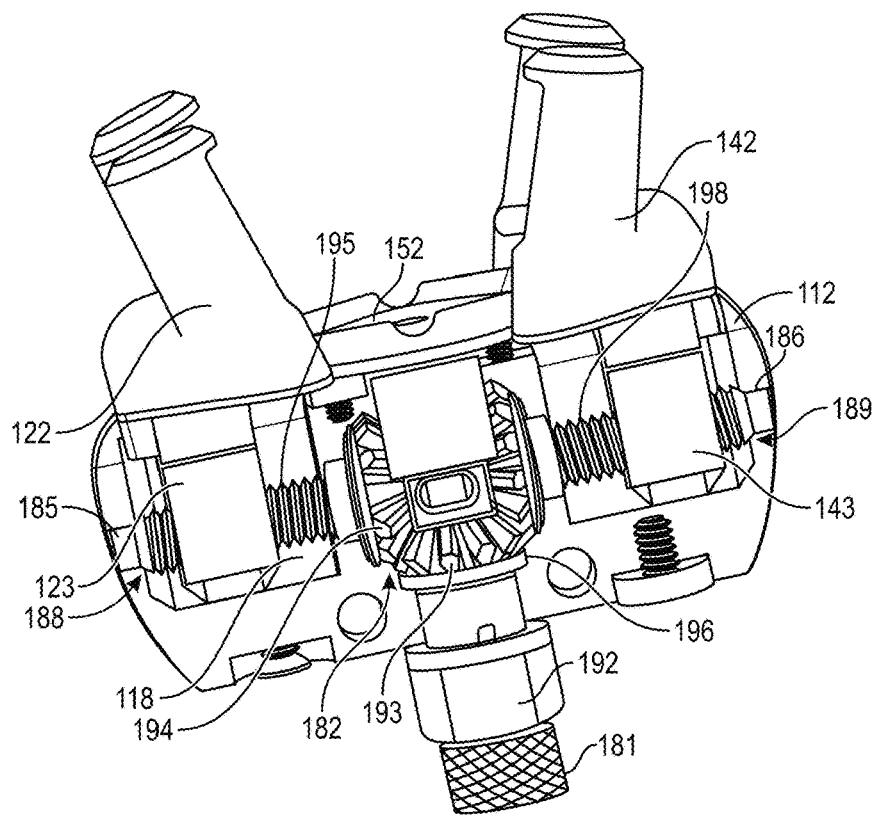
Figure 1G:
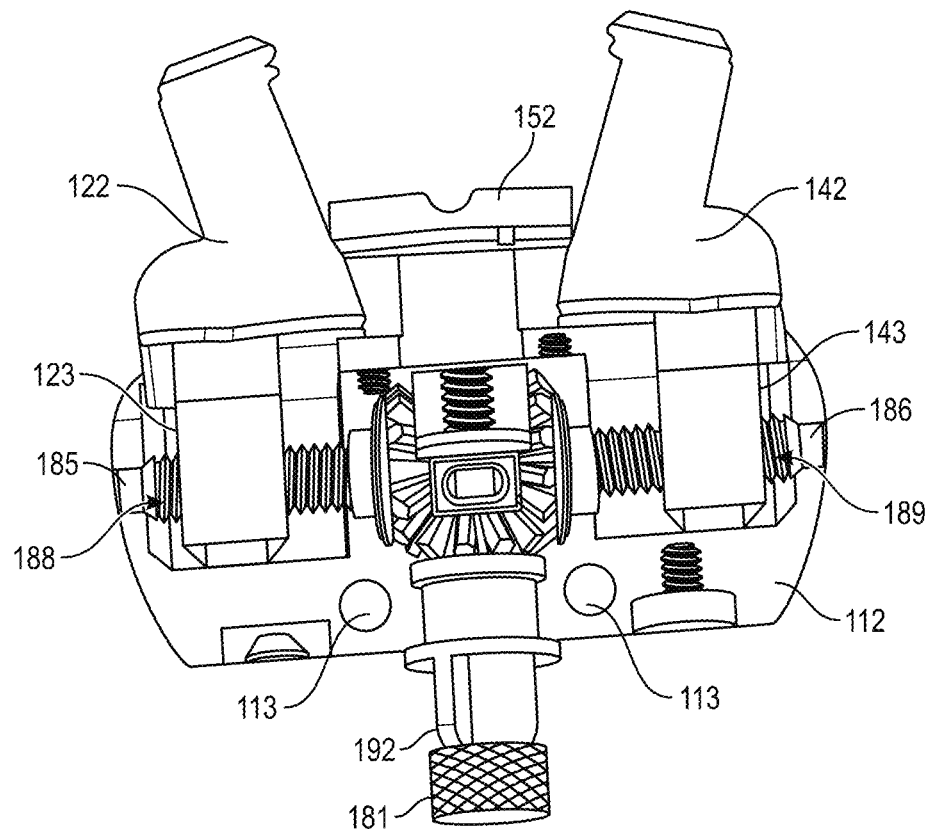

FIG. 1C is an exploded view of an upper portion of the adjustable security bracket 102, which upper portion does not include the base assembly 162. FIG. 1D is another exploded view of the upper portion of the adjustable security bracket 102, which shows how the main body 112 can be made up of two halves that can be screwed or otherwise attached to one another during assembly. FIG. 1E is a side view of the adjustable security bracket 102 with a wall of the main body 112 removed to show some of the internal workings of the bracket 102. FIG. 1F is a side-perspective view of the upper portion of the adjustable security bracket 102 with a wall of the main body 112 again removed to show some of the internal workings of the bracket 102, and with the base assembly 162 removed. In FIG. 1E the arm assemblies 122, 142 are shown as being relatively close to one another, i.e., in a retracted position. By contrast, in FIG. 1F the arm assemblies 122, 142 are shown as being further apart from one another than shown in FIG. 1E, i.e., in an extended position. Explained another way, in FIG. 1E the arm assemblies 122, 142 are shown as being retracted relative to the main body 112, and in FIG. 1F the arm assemblies 122, 142 are shown as being extended relative to the main body 112. FIG. 1G is a side view of a portion of the adjustable security bracket 102 with a wall of the main body 112 again removed to show some of the internal workings of the bracket 102, with the base assembly 162 removed, and with the back support 152 extended upward.

Referring to FIGS. 1A and 1B, the first arm assembly 122 includes a pair of arms 124, 128, with each of the arms 124, 128 including a respective inwardly projecting brace 126, 130 at the distal end thereof. The first arm assembly 122 also includes a pedestal 123 having an internally threaded bore 125 (aka a threaded through hole) extending therethrough generally perpendicular to the arms 124, 128. Similarly, the second arm assembly 142 includes a pair of arms 144, 148, with each of the arms 144, 148 include a respective inwardly projecting brace 146, 150. The second arm assembly 142 also includes a pedestal 143 having an internally threaded bore 145 (aka a threaded through hole) extending therethrough generally perpendicular to the arms 144, 148. The braces 126, 130 of the first arm assembly 122 and the braces 146, 150 of the second arm assembly 142 prevent a portable device (e.g., smartwatch) that is secured between the first and second arm assemblies 122, 142 from being pulled upward and out of the security bracket 102.

The adjustable security bracket 102 includes a drivetrain 182 that is used to selectively extend and retract the first and second arm assemblies 122, 142 relative to the main body 112 so that portable devices (e.g., smartwatches) of various different lengths and diameters can be secured to the bracket 102, and when desired, removed from the bracket 102. The adjustable security bracket 102 also includes a rotatable shaft 172 that is used to selectively move the back support 152 up and down relative to the main body 112 so that portable devices (e.g., smartwatches) of various different thicknesses can be secured to the bracket 102, and when desired, removed from the bracket 102. The rotatable shaft 172 can also be used to move the back support 152 up and down to accommodate a charger (e.g., a puck charger) that may be placed between a backside of the portable device and an upper surface of the back support 152, so that the charger can be used to charge the portable device (if the portable device has a rechargeable battery) while the portable device is secured to the adjustable security bracket 102. As shown in FIG. 1C, the rotatable shaft 172 includes a threaded upper portion 173, a circumferential flange 174, and a lower portion 175, the purposes of which are explained further below. The back support 152, when properly adjusted using a thumbscrew 181 secured to the lower portion 175 of the rotatable shaft 172, firmly wedges a portable device (e.g., smartwatch) alone, or stacked above a charger, between the back support 152 and the braces 126, 130, 146, 150 of the arm assemblies 122, 142, so that the portable device cannot be removed from the security bracket 102.

While the rotatable shaft 172 and the drivetrain 182, or portions thereof, can be seen in FIGS. 1B-1G, the rotatable shaft 172 and the drivetrain 182 are substantially or completely hidden within the main body 112, and thus, are not readily seen when the adjustable security bracket 102 is being used to secure a portable device (e.g., smartwatch) to a display surface (e.g., tabletop), as can be appreciated from FIG. 1A. The drivetrain 182 is manually controlled using a thumbscrew 192, and the rotatable shaft 172 is manually controlled using the thumbscrew 181. More specifically, responsive to the thumbscrew 192 being rotated in a first rotational direction, the drivetrain 182 causes the first and second arm assemblies 122, 142 to retract (i.e., move toward from one another); and responsive to the thumbscrew 192 being rotated in a second rotational direction (opposite the first rotational direction), the drivetrain 182 causes the first and second arm assemblies 122, 142 to extend (i.e., move away from one another). The first rotational direction can be clockwise, and the second rotational direction can be counterclockwise, or vice versa, depending upon the specific implementation. Responsive to rotating the thumbscrew 181 in a first rotational direction, the rotational shaft 172 is rotated in the first rotational direction to cause the back support 152 to move upward; and responsive to rotating the thumbscrew 181 in a second rotational direction, the rotational shaft 172 is rotated in the second rotational direction to cause the back support 152 to move downward. Since both retracting the first and second arm assemblies 122, 142 and moving the back support 152 upward are used to secure a portable device (e.g., smartwatch) to the adjustable security bracket 102, and extending the first and second arm assemblies 122, 142 and moving the back support downward are used to remove the portable device (e.g., smartwatch) from the adjustable security bracket 102, it is preferably that the bracket 102 is implemented such that manually rotating both thumbscrews 192, 181 in a same first rotational direction causes the first and second arm assemblies 122, 142 to retract and the back support 152 to move upward, and manually rotating both thumbscrews 192, 181 in a same second rotational direction causes the first and second arm assemblies 122, 142 to extend and the back support 152 to move downward. The thumbscrews 192, 181 can be referred to more generally as rotational actuators 192, 181.

Referring to FIG. 1C, the drivetrain 182 includes a T-shaped axle assembly 183, and driveshafts 188, 189, and 190. The T-shaped axle assembly 183 includes connector block 184 from which axles 185, 186 extend such that they are axially aligned with one another, and a further axle 187 extends in a perpendicular direction relative to the other axles 185, 186. Each of the driveshafts 188, 189 and 190 includes a respective axial bore 191, 197 and 199 that extends along a longitudinal length of the driveshaft and enables the driveshafts 188, 189 and 190 to be inserted over and rotate around the axles 185, 186 and 187, respectively. The axles 185, 186 and 187 are not intended to rotate, but rather, are static axles around which the driveshafts 188, 189 and 190 rotate respectively. Additional details of the T-shaped axle assembly 183 and other components of the drivetrain 182 are described below with reference to FIGS. 2 and 3, as well as other FIGS.

Figure 2:
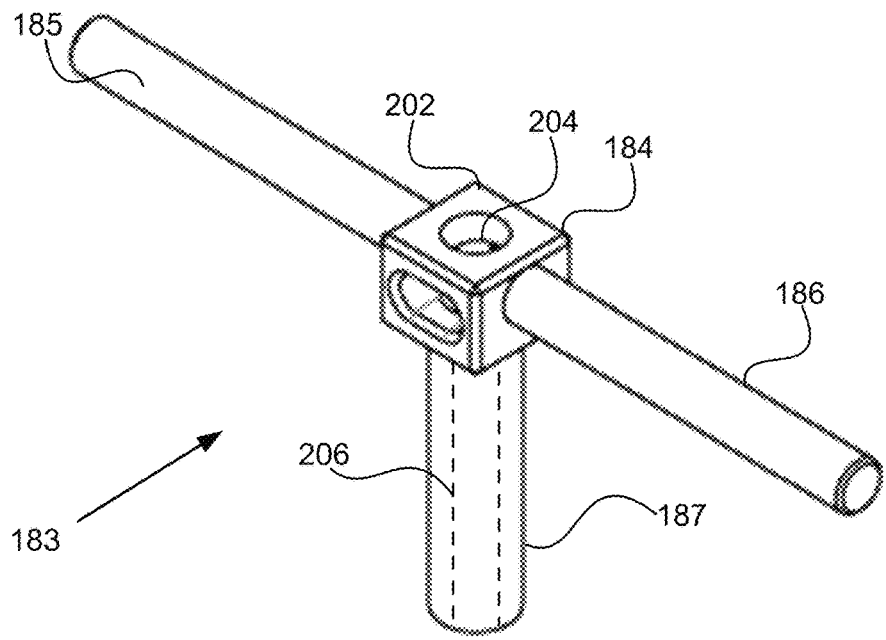
FIG. 2 illustrates a T-shaped support frame of the drivetrain introduced in FIG. 1, according to an embodiment of the present technology.
Figure 3:
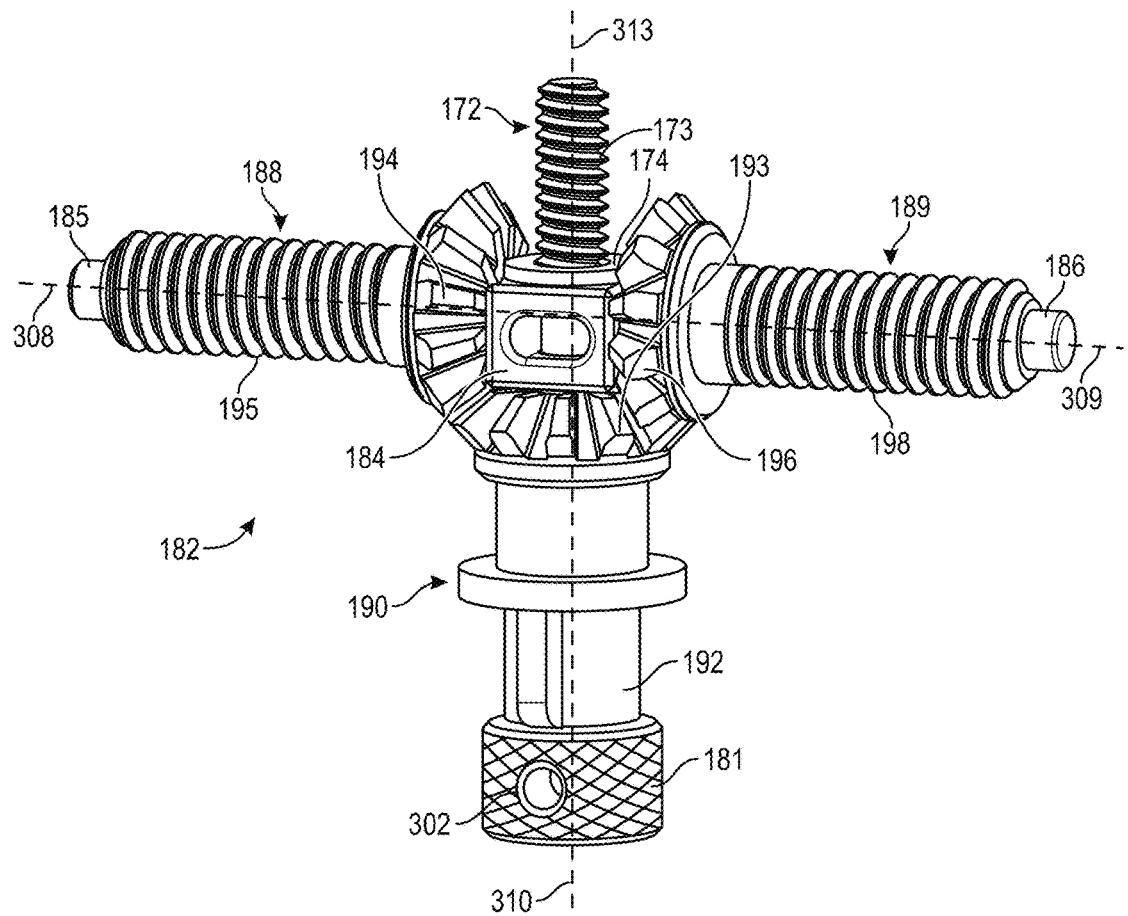
FIG. 3 illustrates additional details of the drivetrain of the adjustable security bracket, according to an embodiment of the present technology.
Figure 4A:
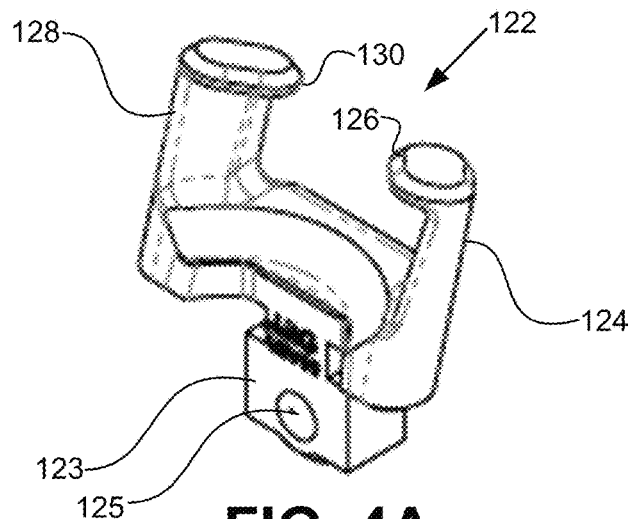
FIGS. 4A-4E illustrate an arm assembly of the adjustable security bracket, according to an embodiment of the present technology.
Figure 4B:
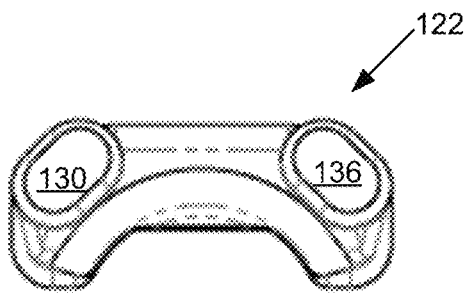
Figure 4C:
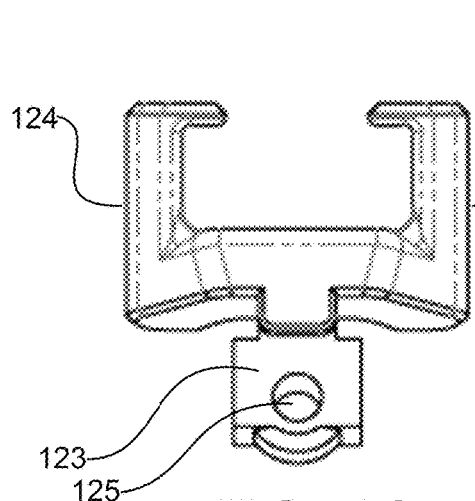
Figure 4D:
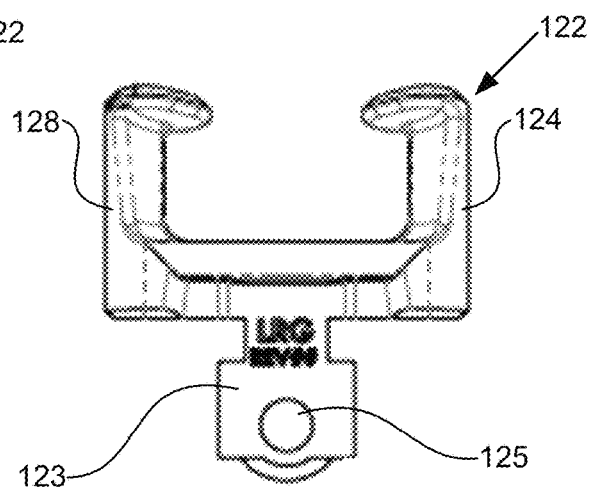
Figure 4E:
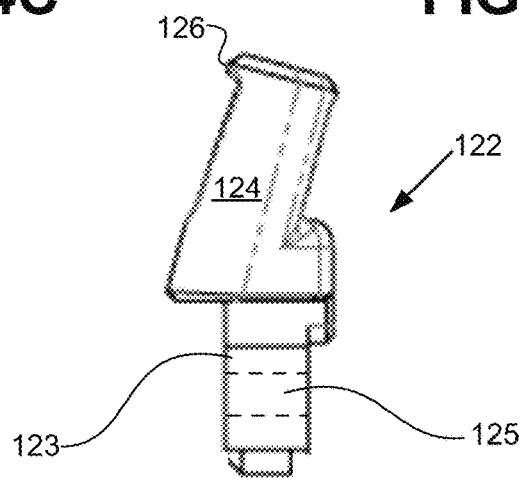

Referring briefly to FIG. 2, the connector block 184 includes an upper surface 202 through which a through hole 204 extends, which is axially aligned with an axial bore 206 that extends longitudinally through the axle 187. A lower portion of the rotatable shaft 172 is inserted into the through hole 204 and through the axial bore 206 such that the circumferential flange 174 rests on the upper surface 202 of the connector block 184, as shown in FIG. 3. While the circumferential flange 174 rests on the upper surface 202 of the connector block 184, the threaded upper portion 173 of the rotatable shaft 172 extends above the connector block 184, and a lower portion 175 of the rotatable shaft 172 extends below a bottom end of the axle 187. As shown in FIG. 3, the thumbscrew 181 attaches to a bottom portion of the lower portion 175 of the rotatable shaft 172 (that extends below a bottom end of the axle 187), e.g., using a short headless screw (not shown in FIG. 3) that is screwed into a radial internally threaded bore 302 in the side of the thumbscrew 181. As shown in FIG. 3, an outer circumference of the thumbscrew 181 is shown as being knurled or having textured features to assist a user with rotating the thumbscrew 181. As also shown in FIG. 3 (and FIGS. 6A and 6C), an outer circumference of the thumbscrew 192 includes protrusions to assist a user with rotating the thumbscrew 192. However, it is noted that it is alternatively possible that the outer circumference of the thumbscrew 192 includes knurled or textured features (similar to those on the outer circumference of the thumbscrew 181) and/or that the outer circumference of the thumbscrew includes protrusions (similar to those on the outer circumference of the thumbscrew 192). Other variations are also possible and within the scope of the embodiments described herein.

As can be appreciated from FIG. 3, the driveshaft 188 and the driveshaft 189 are axially aligned with one another. This results in a rotational axis 308 of the driveshaft 188 to be axially aligned with a rotational axis 309 of the driveshaft 189. As can also be appreciated from FIG. 3, the driveshaft 190 is perpendicular to the driveshafts 188 and 189, which results in a rotational axis 310 of the driveshaft 190 being perpendicular to the rotational axes 308 and 309 of the driveshafts 188 and 189. Also shown in FIG. 3 is that a rotational axis 313 of the rotational shaft 172 is axially aligned with the rotational axis 310 of the driveshaft 190, and perpendicular to the rotational axes 308 and 309 of the driveshafts 188 and 189.

Referring to FIG. 1C, the driveshaft 188 includes the axial bore 191 that extends longitudinally therethrough, which enables the driveshaft 188 to be inserted over and rotate around the axle 185. The driveshaft 188 also includes a bevel gear 194 at one end thereof and an externally threaded portion 195. The externally threaded portion 195 of the driveshaft 188 is configured to be screwed into (aka threaded into) the internally threaded bore 125 of the pedestal 123 of the first arm assembly 122, so that rotation of the driveshaft 188 in first and second rotational directions cause the entire first arm assembly 122 to move fore and aft relative to the main body 112. Similarly, the driveshaft 189 includes the axial bore 197 that extends longitudinally therethrough, which enables the driveshaft 189 to be inserted over and rotate around the axle 186. The driveshaft 189 also includes a bevel gear 196 at one end thereof and an externally threaded portion 198. The externally threaded portion 198 of the driveshaft 189 is configured to be screwed into (aka threaded into) the internally threaded bore 145 of the pedestal 143 of the second arm assembly 142, so that rotation of the driveshaft 189 in first and second rotational directions cause the entire second arm assembly 142 to move fore and aft relative to the main body 112. The driveshaft 190 includes the axial bore 199 that extends longitudinally through the driveshaft 190, which enables the driveshaft 190 to be inserted over and rotate around the axle 187. The driveshaft 190 also includes a bevel gear 193 at its upper end, such that when the thumbscrew 192 is used to rotate the driveshaft 190 the bevel gear 193 rotates in a same direction that the thumbscrew 192 is being rotated.

As can be appreciated by FIGS. 1F-1G and 3, the bevel gear 193 of the driveshaft 190 intermeshes with the bevel gear 194 of the driveshaft 188 and the bevel gear 196 of the driveshaft 189, such that when the driveshaft 190 is rotated manually using the thumbscrew 192 the driveshafts 188 and 189 are both rotated. When the driveshafts 188 and 189 are rotated the respective externally threaded portions 195 and 198 thereof are rotated in opposite directions. As noted above, the externally threaded portion 195 of the driveshaft 188 is threaded through the internally threaded bore 125 of the pedestal 123 of the first arm assembly 122, and the externally threaded portion 198 of the driveshaft 189 is threaded through the internally threaded bore 145 of the pedestal 143 of the second arm assembly 142. Accordingly, responsive to the driveshaft 190 being rotated manually in first and second rotational directions using the thumbscrew 192, the first and second arm assemblies 122 and 142 are caused to be move in opposite directions relative to one another so that they are simultaneously retracted or expanded.

FIGS. 4A, 4B, 4C, 4D and 4E are, respectively, perspective, top, back, front, and side views of the first arm assembly 122. In an embodiment, the second arm assembly 142 is a mirror image of the first arm assembly 122. Indeed, in an embodiment the first and second arm assemblies 122, 142 are identical to one another, i.e., are two separate instances of the same manufactured part, which simplifies manufacturing. As shown in the side view of FIG. 4E, in certain embodiments the arm 124 (as well as the other arms 128, 144 and 148) are at an angle of about 15 degrees (or some other angle) relative to an axis that extends through the bore 125 in the pedestal 123.

Figure 5A:
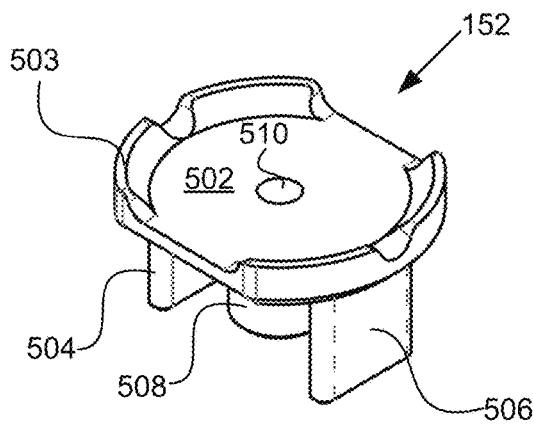
FIGS. 5A-5E illustrate a back support of the adjustable security bracket, according to an embodiment of the present technology.
Figure 5B:
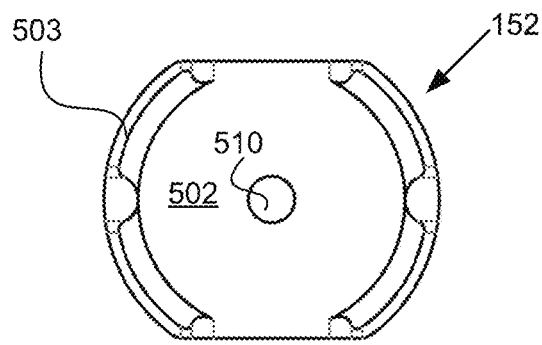
Figure 5C:
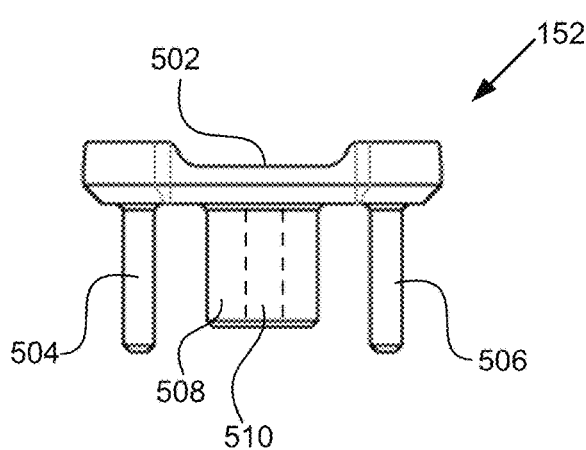
Figure 5D:
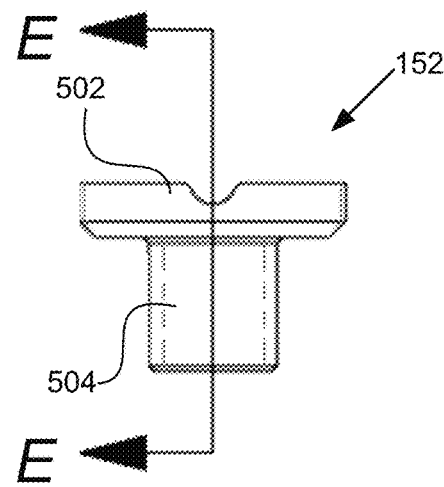
Figure 5E:
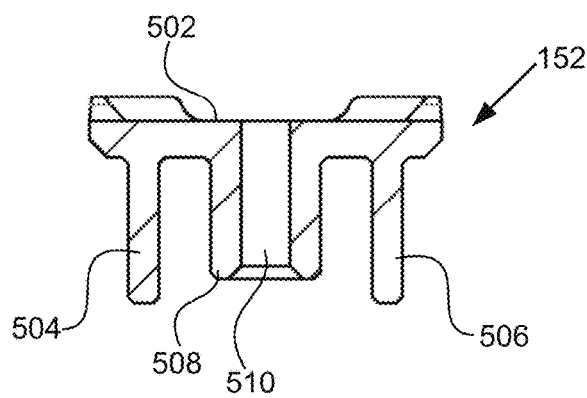

FIGS. 5A, 5B, 5C and 5D are, respectively, perspective, top, front and side views of the back support 152. FIG. 5E is a cross-sectional view of the back support 152 along the line E-E in FIG. 5D. As shown in FIGS. 5A-5E the back support 152 includes an upper surface 502 that is surrounded by a rim 503. There are recesses spread about the rim 502 to accommodate lugs and buttons of a watch or other wrist worn wearable portable device. Extending downward from a center of the back support 152 is a support body 508 in which is located an internally threaded bore 510 into which the threaded upper portion 173 of the rotatable shaft 172 is screwed. Also extended downward from the back support 152 are guide rails 504 and 506, which are located on opposing sides of the support body 508. Referring briefly back to FIGS. 1C and 1D, the guide rails 504, 506 are intended to move up and down within the guide slots 114, 116 in the main body 112, to control the motion of the back support 152 and keep the back support 152 level as the back support 152 is moved up and down relative to the main body 112. It is noted that many of the internally threaded bores described herein, such as the internally threaded bores 510, 125 and 145, needed not extend entirely through the components in which they are located, i.e., they can be similar blind holes.

Referring to FIGS. 1C and 1D, the main body includes the guide slots 114, 116, a pair of opposing channels 118, 119, and a central bore 120. When the adjustable security bracket 102 is fully assembled, the axle 185 extends within the channel 118, the axle 186 extends within the channel 119, and the axle 187 extends within the central bore 120. Also located within the channel 118 is the driveshaft 188 that rotates around the axle 185, and the pedestal 123 of the first arm assembly 122 which moves back and forth (and thereby moves the entire first arm assembly 122 back and forth) in response to the driveshaft 188 rotating in opposing rotational directions. Also located within the channel 119 is the driveshaft 189 that rotates around the axle 186, and the pedestal 143 of the second arm assembly 142 which moves back and forth (and thereby moves the entire second arm assembly 142 back and forth) in response to the driveshaft 189 rotating in opposing rotational directions.

Figure 6A:
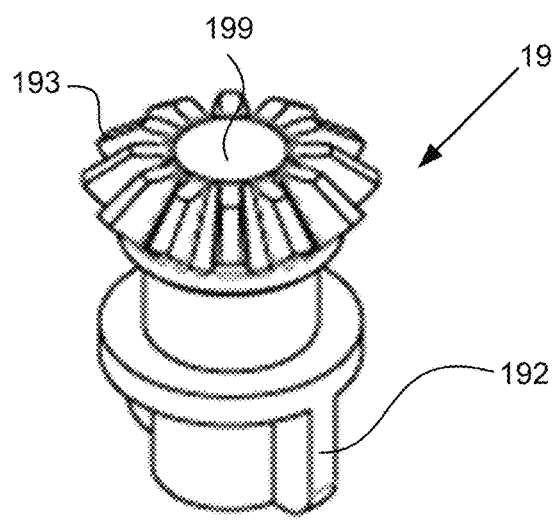
FIGS. 6A-6C illustrate additional details of a user rotatable driveshaft of the drivetrain shown in FIG. 3.
Figure 6B:
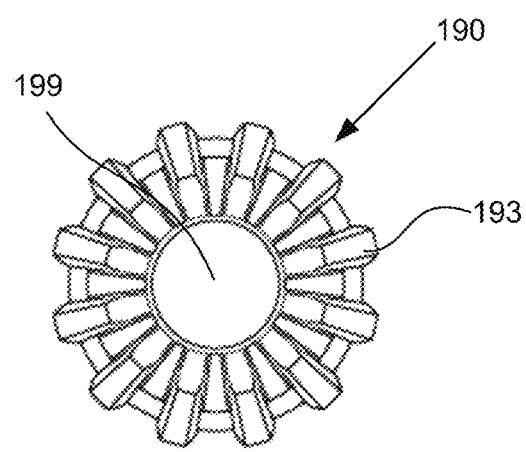
Figure 6C:
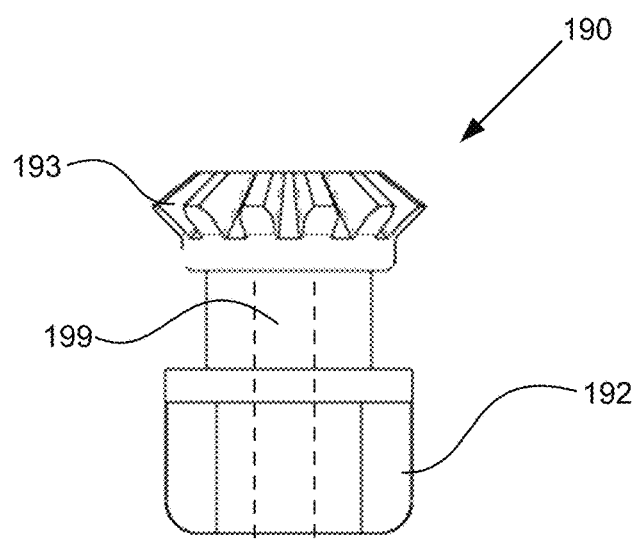

FIGS. 6A, 6B and 6C are, respectively, perspective, top and side views of the driveshaft 190. As was described in the discussion of FIG. 1C, the driveshaft 190 includes the axial bore 199 that extends longitudinally through the driveshaft 190, which enables the driveshaft 190 to be inserted over and rotate around the axle 187. The driveshaft 190 also includes the bevel gear 193 at its upper end, such that when the thumbscrew 192 is used to rotate the driveshaft 190 the bevel gear 193 rotates. The driveshaft 190 can be cast and/or machined as a single component, or can be made up of multiple subcomponents that are connected (e.g., welded) together. For example, the thumbscrew 192 can be integrally formed with the driveshaft 190, or can be separately formed and attached to the driveshaft 190, e.g., using a screw, welding, crimpling and/or an adhesive, but not limited thereto.

Figure 7A:
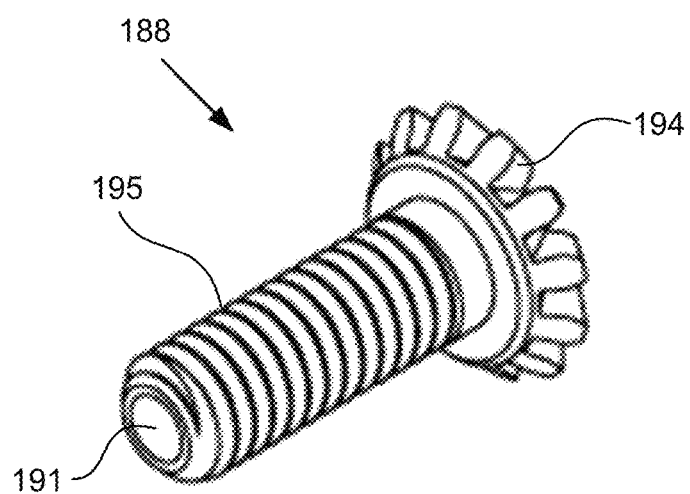
FIGS. 7A-7C illustrates additional details of another driveshaft of the drivetrain shown in FIG. 3.
Figure 7B:
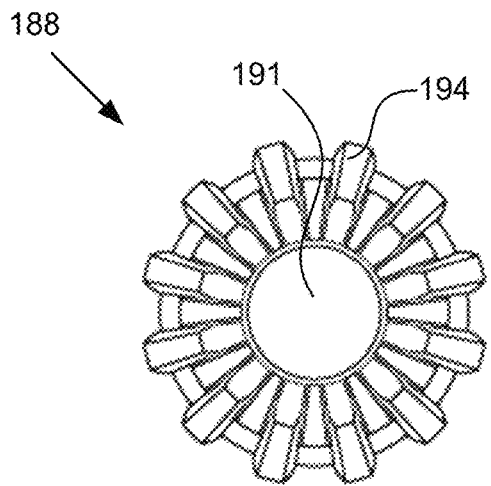
Figure 7C:
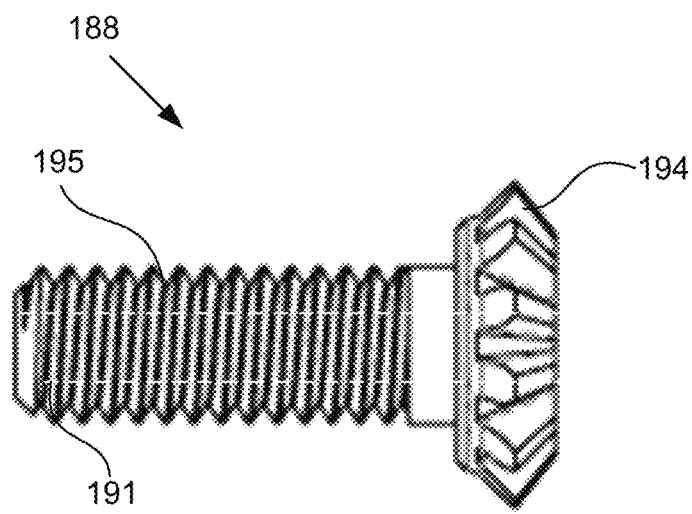

FIGS. 7A, 7B and 7C are respectively, perspective, top and side views of the driveshaft 188. As was described above with reference to FIG. 1C, the driveshaft 188 includes the bevel gear 194 at one end thereof, and the externally threaded portion 195. The driveshaft 188 also includes that axial bore 191 that extends longitudinally therethrough, which enables the driveshaft 188 to be inserted over and rotate around the axle 185. In an embodiment, the driveshaft 189 is a mirror image of the driveshaft 188. Indeed, in an embodiment the driveshafts 188 and 189 are identical to one another, i.e., are two separate instances of the same manufactured part, which simplifies manufacturing.

FIGS. 8A, 8B, 8C and 8D are, respectively, perspective, top, front and side views of the rotatable shaft 172. As was described above with reference to FIG. 1C, the rotatable shaft 172 includes the circumferential flange 174, above which is the threaded upper portion 173 and below which is the lower portion 175. As shown in FIGS. 8A, 8C and 8D a detent or blind hole 802 is included in the lower portion 175 of the rotatable shaft 172. The detent or blind hole 802 is used to accept a headless screw (not shown) that is screwed into the radial bore 302 (shown in FIG. 3) of the thumbscrew 181, to thereby affix the thumbscrew 181 to the lower portion 175 of the rotatable shaft 172, after the lower portion 175 has been inserted through the axial bore 199 of the driveshaft 190 during assembly of the adjustable security bracket 102. This way the rotatable shaft 172 can be rotated independently of the driveshaft 190 (through which the lower portion 175 of the rotatable shaft 172 extends) by rotating the thumbscrew 181 without rotating the thumbscrew 192. It is also possible to rotate the rotatable shaft 172 and the driveshaft 190 simultaneously by rotating the thumbscrews 181 and 192 at the same time.

Referring briefly back to FIGS. 4A-4E, the arm assembly 122 shown therein is implemented as a unitary component. Such a unitary component, as noted above, can be cast and/or machined during manufacture, but is not limited thereto. Once an instance of the adjustable security bracket 102 that includes the unitary type of arm assemblies 122, 142 is assembled, the arm assemblies 122, 142 are not intended to be removed from the adjustable security bracket 102. In accordance with alternative embodiments, which are described below with reference to FIGS. 9A-9E and 10A-10E, each of the arm assemblies 122, 142 is implemented as a two part component which enables an upper portion of each of the arm assemblies 122, 142 to be replaceable, to thereby enable the adjustable security bracket 102 to be used with a greater variety of different sized portable devices (e.g., smartwatches). More specifically, upper portions of arm assemblies 122, 142 that include a pair of arms (124 and 128, or 144 and 148) are separable from the lower portions that include the pedestals (123 or 143). In such an embodiment, once an instance of the adjustable security bracket 102 that includes the separable type of arm assemblies 122, 142 is assembled, the lower portions of the arm assemblies (that each include a respective pedestal 123, 143) are not intended to be removed from the adjustable security bracket 102, but the upper portions of arm assemblies 122, 142 that each include a respective pair of arms (124 and 128, or 144 and 148) are intended to be selectively removed and replaced.

Figure 9A:
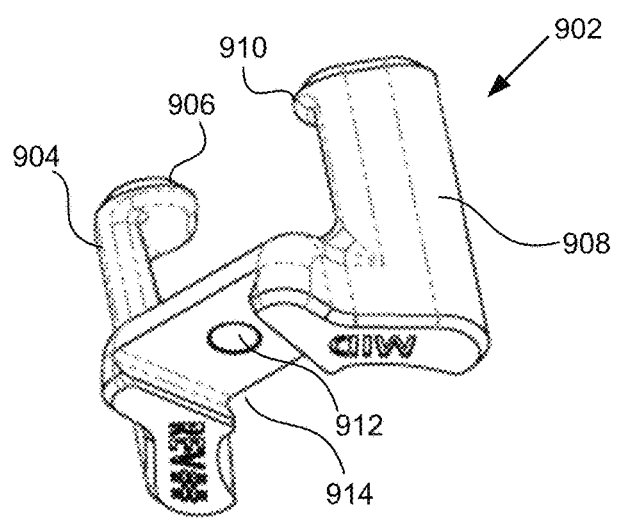
FIGS. 9A-9E illustrate an example removable and replaceable portion of an arm assembly, according to an embodiment of the present technology.
Figure 9B:
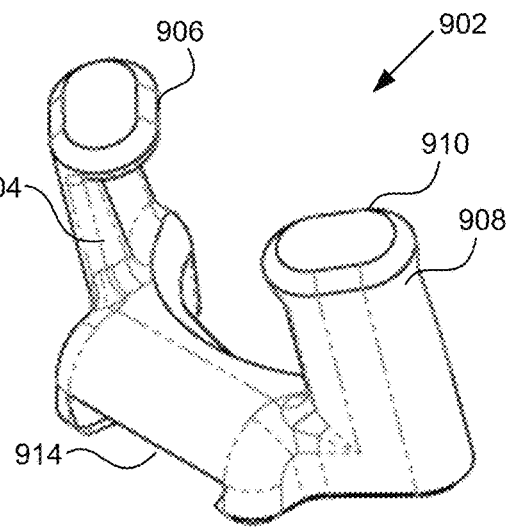
Figure 9C:
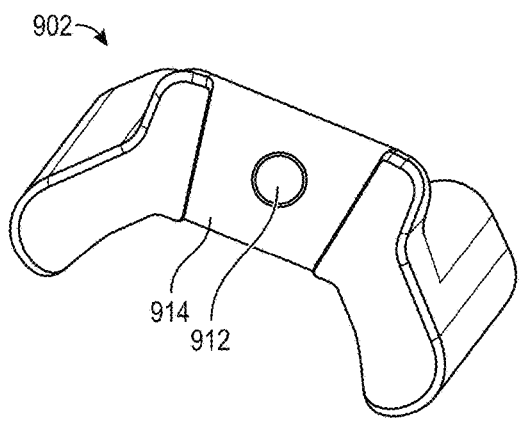
Figure 9D:
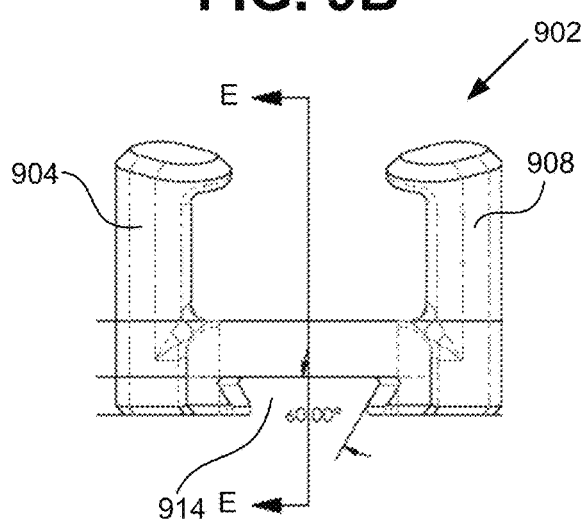
Figure 9E:
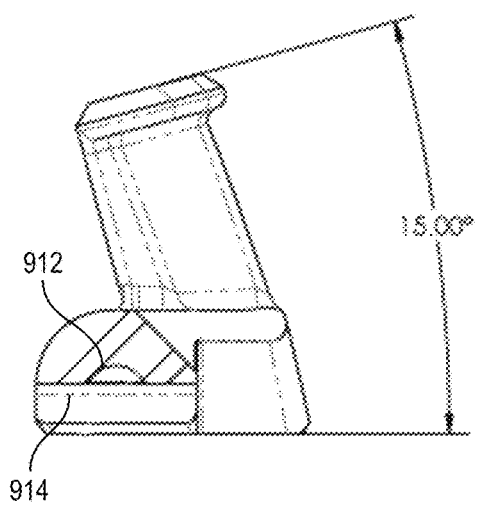

FIGS. 9A-9C are various different perspective views of an upper portion of an arm assembly, which can also be referred to as an upper arm subassembly 902. FIG. 9D is a rear view of the upper arm subassembly 902, and FIG. 9E is a cross-sectional side view of the upper arm subassembly 902 along the line E-E in FIG. 9D. The upper arm subassembly 902 includes a pair of arms 904, 908, with each of the arms 904, 908 including a respective inwardly projecting brace 906, 910 at the distal end thereof. An underside of the upper arm subassembly 902 includes a channel 914 that has a trapezoidal shape when viewing the channel from the bottom (as shown in FIG. 9C) and has an inverted trapezoidal shape when viewing the channel from the rear (as shown in FIG. 9D). The channel 914 functions similar to a dovetail socket of a dovetail joint, and thus, can also be referred to as a dovetail channel 914. Within an upper surface of the dovetail channel 914 is a detent 912, as shown in FIGS. 9A and 9C.

Figure 10A:
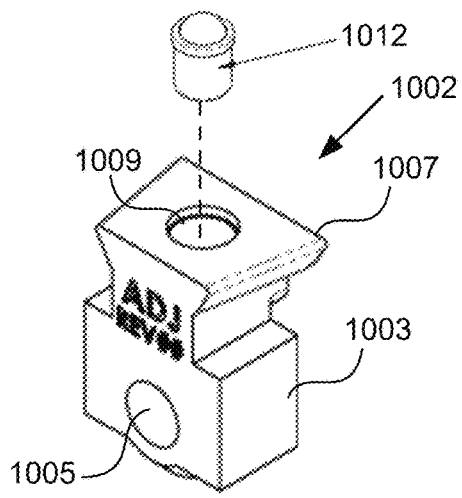
FIGS. 10A-10E illustrate a non-removable portion of an arm assembly, according to an embodiment of the present technology.
Figure 10B:
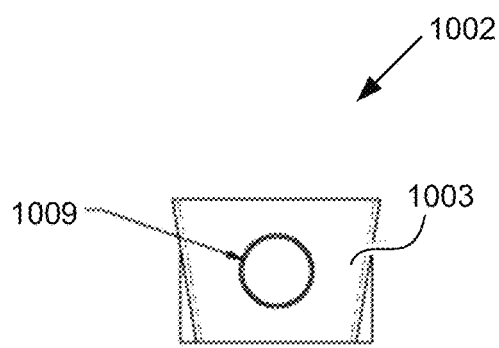
Figure 10C:
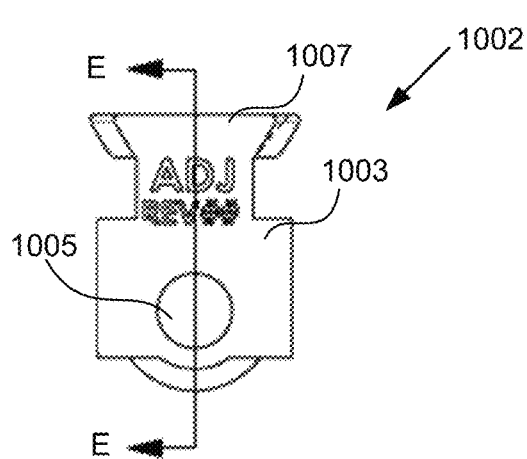
Figure 10D:
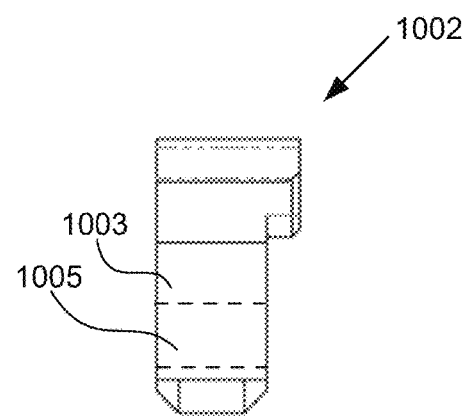
Figure 10E:
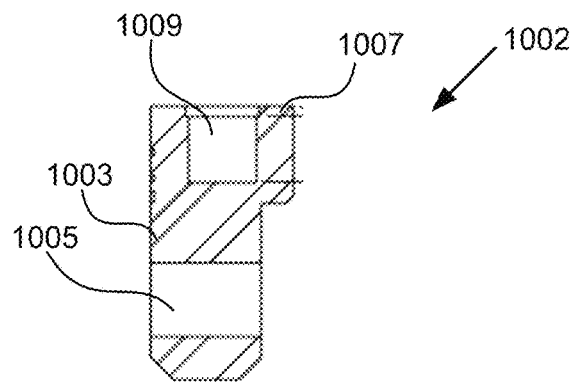

FIGS. 10A, 10B, 10C and 10D are, respectively, perspective, top, front and side views of a lower portion of an arm assembly, which can also be referred to as a lower arm subassembly 1002. FIG. 10E is a cross-sectional side view of the lower arm subassembly 1002 along the line E-E in FIG. 10C. The lower arm subassembly includes a pedestal 1003 having an internally threaded bore 1005 (aka a threaded through hole) extending therethrough. A top of the pedestal 1003 includes a tongue 1007 that has a trapezoidal shape when viewed from the top (as shown in FIGS. 10A and 10B) and has an inverted trapezoidal shape when viewed from the front (as shown in FIG. 10C). The tongue 1007 functions similar to a dovetail of a dovetail joint, and thus, can also be referred to as a dovetail tongue 1007. Within an upper surface of the dovetail tongue 1007 is a blind hole 1009, as shown in FIGS. 9A and 9C. A ball-nosed plunger 1012 can be inserted into the blind hole 1009 at the top of the dovetailed tongue 1007, as shown in FIG. 10A. The dovetail tongue 1007 (of the lower arm subassembly 1002) is sized and shaped to fit within the dovetail channel 914 (of the upper arm subassembly 902), such that upper arm subassembly 1002 can be slid over and attached to the lower arm subassembly 902. The ball-nosed plunger 1012 (shown in FIG. 10A) that sits in the blind hole 1009 engages with the detent 912 in the upper surface of the dovetail channel 914 to help hold the subassemblies 902 and 1002 together.

The above described configurations of the subassemblies 902 and 1002 enables the various different sized, shaped and/or colored versions of the upper arm subassembly 902 to be selectively attached to and removed from the lower arm subassembly 1002. For example a first version of the upper arm subassembly 902 can be sized and shaped to be used with small and medium sized portable devices (e.g., small and medium sized smartwatches), and a second version of the upper arm subassembly 902 can be sized and shaped to be used with large sized portable devices (e.g., large smartwatches). It is also possible that certain upper arm subassemblies are for use with rectangular (including square) portable devices, and other subassemblies are for use with round portable devices. These are just a few examples, which are not intended to be all encompassing. A first instance of the upper and lower arm subassemblies 902 and 1002, collectively, can used be as the first arm assembly 122 discussed above with reference to FIGS. 1A-1G and FIGS. 4A-4E. Similarly, a second instance of the upper and lower arm subassemblies 902 and 1002, collectively, can be used as the second arm assembly 142 discussed above with reference to FIGS. 1A-1G.

As can be appreciated from FIGS. 9A-9E and 10A-10E, the dovetail tongue 1002 (of the lower arm subassembly 1002) and the dovetail channel 914 (of the upper arm subassembly 902) both taper inward such that the upper arm subassembly 902 cannot be removed from the lower arm subassembly 1002 while a portable device (e.g., smartwatch) is secured between a pair of the upper arm subassemblies 902. The taper also prevents the upper arm subassembly 902 from being pushed outward relative to the lower arm subassembly 1002. Further, the dovetail shapes of the dovetail tongue 1002 (of the lower arm subassembly 1002) and the dovetail channel 914 (of the upper arm subassembly 902) prevents the upper arm subassembly 902 from being lifted upward relative to the lower arm subassembly 1002. Beneficially, the only way the upper arm subassemblies 902 can be removed from the lower arm subassemblies 1002 is by sliding each of the upper arm assemblies 9002 inward (towards the back support 152 of the adjustable security bracket 102), while there is no portable device (e.g., smartwatch) secured between a pair of the upper arm subassemblies 902. In certain embodiments, the upper arm subassemblies 902 can only be removed from the lower arm subassemblies 1002 when the arm assemblies are fully extended, i.e., moved as far apart from one another as possible, otherwise the back support 152 will prevent the upper arm assemblies 902 from being removed.

Referring now to FIG. 11, shown therein are two halves 1102, 1112 of the base assembly 162 initially introduced above in the discussion of FIGS. 1A and 1B. As can be appreciated from the exploded view of the base assembly 162 shown in FIG. 1B, each of the halves 1102, 1112 can be made up of multiple components that are attached to one another via welding, screws and/or the like. As will be described below, various different attachment mechanisms can be attached to the bottom of the base assembly 162, after the two halves 1102, 1112 are attached to one another, to thereby enable the adjustable security bracket 102 to be attached in various different manners to various different types of display surfaces. In certain embodiments, a portable device (e.g., smartwatch) should be secured to the main body 112 by placing the portable device on the back support 152 and between the first and second arm assemblies 122, 142, and then using the thumbscrews 181 and 192 to secure the portable device to the main body 112. Then, the halves 1102, 1112 of the base assembly 162 are attached to the main body 112 by inserting posts 1114 and 1104 of the halves 1102, 1112 of the base assembly 162 into openings 113 (see FIG. 1G) in the sides of the main body 112. Other ways of attaching the base assembly 162 to the main body 112 are also possible and within the scope of the embodiments described herein.

One or more fasteners (e.g., bolts) can extend from the underside or backside of each of the halves of the base assembly 162, e.g., by attaching an instance of a fastener assembly 1202, shown in FIG. 12, to each of the halves 1102, 1112 of the base assembly 162 using screws (e.g., screws 166 in FIG. 1B), or the like. FIG. 13 shows an alternative fastener assembly 1302 that can be attached to the base assembly 162, wherein the fastener assembly 1302 includes a single threaded bolt or shaft 1304 that extends downward for insertion into a hole in a tabletop or other display surface. Other variations are also possible and within the scope of the embodiments described herein.

Figure 14A:
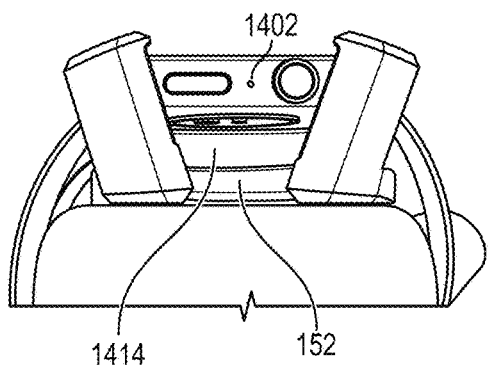
FIGS. 14A-14D show the adjustable security bracket securing various different sized and shaped smartwatches.
Figure 14B:
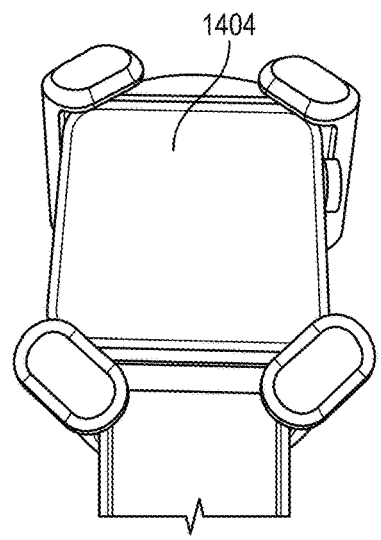
Figure 14C:
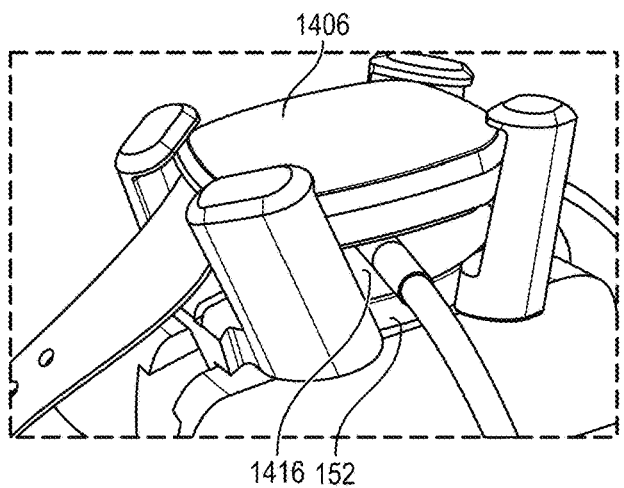
Figure 14D:
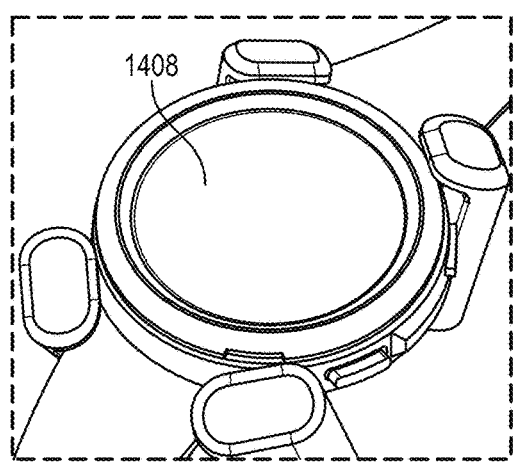

FIGS. 14A-14D show the adjustable security bracket securing various different smartwatches 1402, 1404, 1406, 1408. In FIG. 14A a puck charger 1414 is shown as being secured between the smartwatch 1404 and the back support 152 of the adjustable security bracket. In FIG. 14B the smartwatch 1404 is shown as having a rounded cornered elongated rectangular shape. In FIG. 14C the smartwatch 1404 is shown as having a rounded cornered square shape. In FIG. 14C a charger 1416 is shown as being secured between the smartwatch 1406 and the back support 152 of the adjustable security bracket. In FIG. 14D the smartwatch 1406 is shown as having a round shape. The adjustable security brackets described herein can be used to secure other types of portable devices besides smartwatches, and more generally, besides wrist worn wearables, so long as the arm assemblies are appropriately designed and scaled.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. For example, tabs can be located at longitudinal ends of the main body 112, or on portions of the arm assemblies, to hold down straps that may be attached to a portable device (e.g., smartwatch) that is secured to the adjustable security bracket. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the FIGS. may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An adjustable security bracket adapted to selectively secure any one of a plurality of different sized portable devices to a display surface, the adjustable security bracket comprising:
    a main body that is selectively securable to the display surface;
    a drivetrain at least a portion of which is located within the main body;
    an actuator attached to and configured to rotate a driveshaft of the drivetrain; and
    first and second arm assemblies each of which includes a respective pair of arms between which a said portable device can be secured to the adjustable security bracket when the said portable device is placed between the first and second arm assemblies and the first and second arm assemblies are moved toward one another;
    wherein the first and second arm assemblies are mechanically coupled to the drivetrain such that the first and second arm assemblies move toward one another in response to the actuator being used to rotate the driveshaft of the drivetrain in a first rotational direction, and the first and second arm assemblies move away from one another in response to the actuator being used to rotate the driveshaft of the drivetrain in a second rotational direction that is opposite the first rotational direction.

2. The adjustable security bracket of claim 1, wherein:
    the driveshaft to which the actuator is attached comprises a first driveshaft; and
    the drivetrain further includes second and third driveshafts that are mechanically coupled to the first driveshaft such that rotation of the first driveshaft using the actuator also causes rotation of the second and third driveshafts.

3. The adjustable security bracket of claim 2, wherein:
    the first driveshaft includes a first bevel gear;
    the second driveshaft includes a second bevel gear;
    the third driveshaft includes a third bevel gear;

the second and third driveshafts are axially aligned with one another and are each perpendicular to the first driveshaft; and
the first bevel gear of the first driveshaft intermeshes with both the second bevel gear of the second driveshaft and the third bevel gear of the third driveshaft.

4. The adjustable security bracket of claim 3, wherein:
the first arm assembly comprises a first pedestal including a first internally threaded bore;
the second arm assembly comprises a second pedestal including a second internally threaded bore that is axially aligned with the first internally threaded bore;
the first driveshaft includes a first externally threaded portion positioned within the first internally threaded bore of the first pedestal of the first arm assembly such that rotation of the first driveshaft causes the first arm assembly to move relative to the main body; and
the second driveshaft includes a second externally threaded portion that is positioned within the second internally threaded bore of the second pedestal of the second arm assembly such that rotation of the second driveshaft causes the second arm assembly to move relative to the main body.

5. The adjustable security bracket of claim 4, wherein:
rotation of the actuator in the first rotational direction causes the first driveshaft to rotate in the first rotational direction, which causes one of the second and third driveshafts to rotate in the first rotational direction, and causes the other one of the second and third driveshafts to rotate in the second rotational direction, thereby causing the first and second arm assemblies to move toward one another; and
rotation of the actuator in the second rotational direction causes the first driveshaft to rotate in the second rotational direction, which causes the one of the second and third driveshafts to rotate in the second rotational direction, and causes the other one of the second and third driveshafts to rotate in the first rotational direction, thereby causing the first and second arm assemblies to move away from one another.

6. The adjustable security bracket of claim 5, wherein:
the actuator comprises a thumbscrew that is accessible from below the main body when the main body is not secured to the display surface, and is inaccessible when the main body is secured to the display surface.

7. The adjustable security bracket of claim 4, wherein:
each of the first and second arm assemblies includes a respective lower arm assembly and a respective upper arm assembly;
the first pedestal is part of the lower arm assembly of the first arm assembly;
the second pedestal is part of the lower arm assembly of the second arm assembly;
the upper arm assembly of each of the first and second arm assemblies is configured to be selectively attached to the lower arm assembly of a respective one of the first and second arm assemblies, and is configured to be selectively removable and replaceable with a differently sized upper arm assembly while the adjustable security bracket is not securing a said portable device to the adjustable security bracket; and
the upper arm assembly of each of the first and second arm assemblies cannot be removed from the respective lower arm assembly thereof while the adjustable security bracket is securing a said portable device to the adjustable security bracket.

8. The adjustable security bracket of claim 7, wherein:
the lower arm assembly of each of the first and second arm assemblies includes a respective dovetail tongue; and
the upper arm assembly of each of the first and second arm assemblies includes a respective dovetail channel that is configured to accept the dovetail tongue of one of the lower arm assemblies to thereby enable the upper arm assembly of each of the first and second arm assemblies to be selectively attached to and removed from the lower arm assembly of each of the first and second arm assemblies while the adjustable security bracket is not securing a said portable device to the adjustable security bracket.

9. The adjustable security bracket of claim 2, further comprising:
a rotatable shaft including a lower portion thereof that extends through a longitudinal bore of the first driveshaft, and including an externally threaded upper portion that extends above the longitudinal bore of the first driveshaft;
a further actuator attached to the lower portion of the rotatable shaft and configured to rotate the rotatable shaft; and
a back support having an upper surface below which is located a support body including an internally threaded bore;
wherein the externally threaded upper portion of the rotatable shaft is positioned within the internally threaded bore of the support body of the back support such that rotation of the rotatable shaft using the further actuator causes the back support to move upwards away from or downwards towards the main body so that portable devices of various different thicknesses can be secured to the adjustable security bracket.

10. The adjustable security bracket of claim 9, wherein:
the back support is configured to push a said portable device upward against braces of the pairs of arms of the first and second arm assemblies to further secure the said portable device to the adjustable security bracket.

11. The adjustable security bracket of claim 9, wherein:
rotation of the further actuator in one of the first and second rotational directions causes the back support to move upwards away from the main body, and rotation of the further actuator in the other one of the first and second rotational directions causes the back support to move downwards towards the main body.

12. The adjustable security bracket of claim 11, wherein:
the actuator comprises a first thumbscrew;
the further actuator comprises a second thumbscrew that is axially aligned with the first thumbscrew; and
the first and second thumbscrews are accessible from below the main body when the main body is not secured to the display surface, and are inaccessible when the main body is secured to the display surface.

13. The adjustable security bracket of claim 1, further comprising:
a base assembly that is attached to or configured to be attached to the main body;
wherein one or more fasteners extending from the base assembly is/are configured to secure the base assembly, and the main body attached thereto, to the display surface.

14. An adjustable security bracket adapted to selectively secure any one of a plurality of different sized portable devices to a display surface, the adjustable security bracket comprising:
a main body;
a base assembly that is attached to or configured to be attached to the main body, the base assembly configured to selectively secure the main body to the display surface;
a drivetrain at least a portion of which is located within the main body;
an actuator attached to and configured to actuate the drivetrain;
first and second arm assemblies each of which includes a respective lower arm assembly and a respective upper arm assembly;
the upper arm assembly of each of the first and second arm assemblies is configured to be selectively attached to the lower arm assembly of a respective one of the first and second arm assemblies, and is configured to be selectively removable and replaceable with a differently sized upper arm assembly while the adjustable security bracket is not securing a said portable device to the adjustable security bracket; and
the upper arm assembly of each of the first and second arm assemblies cannot be removed from the respective lower arm assembly thereof while the adjustable security bracket is securing a said portable device to the adjustable security bracket.

15. The adjustable security bracket of claim 14, further comprising:
a rotatable shaft including a lower portion and including an externally threaded upper portion;
a further actuator attached to the lower portion of the rotatable shaft and configured to rotate the rotatable shaft; and
a back support having an upper surface below which is located a support body including an internally threaded bore;
wherein the externally threaded upper portion of the rotatable shaft is positioned within the internally threaded bore of the support body of the back support such that rotation of the rotatable shaft using the further actuator causes the back support to move upwards away from or downwards towards the main body so that portable devices of various different thicknesses can be secured to the adjustable security bracket.

16. The adjustable security bracket of claim 15, wherein:
the actuator and the further actuator are accessible from below the main body when the main body is not secured to the display surface, and are inaccessible when the main body is secured to the display surface.

17. The adjustable security bracket of claim 15, wherein:
the lower arm assembly of each of the first and second arm assemblies includes a respective dovetail tongue; and
the upper arm assembly of each of the first and second arm assemblies includes a respective dovetail channel that is configured to accept the dovetail tongue of one of the lower arm assemblies to thereby enable the upper arm assembly of each of the first and second arm assemblies to be selectively attached to and removed from the lower arm assembly of each of the first and second arm assemblies while the adjustable security bracket is not securing a said portable device to the adjustable security bracket.

18. An adjustable security bracket adapted to selectively secure any one of a plurality of different sized portable devices to a display surface, the adjustable security bracket comprising:
a main body that is selectively securable to the display surface;
first and second arm assemblies each of which includes a respective pair of arms between which a said portable device can be secured to the adjustable security bracket when the said portable device is placed between the first and second arm assemblies and the first and second arm assemblies are moved toward one another;
a drivetrain mechanically coupled to the first and second arm assemblies;
a first actuator attached to and configured actuate the drivetrain in first and second manners to respectively cause the first and second arm assemblies to move toward and away from one another;
a back support configured to move up and down relative to the main body;
a rotatable shaft mechanically coupled to the back support; and
a second actuator attached to the rotatable shaft and configured to rotate the rotatable shaft in first and second rotational directions to respectively cause the back support to move up and down relative to the main body.

19. The adjustable security bracket of claim 18, wherein:
movement of the first and second arm assemblies enables portable devices of various different lengths and diameters to be secured between arms of the first and second arm assemblies; and
movement of the back support enables portable devices of various different thicknesses to be secured between the back support and braces of the arms of the first and second arm assemblies.

20. The adjustable security bracket of claim 19, wherein:
the first and second actuators are accessible from below the main body when the main body is not secured to the display surface, and are inaccessible when the main body is secured to the display surface.

21. The adjustable security bracket of claim 20, further comprising:
a base assembly that is attached to or configured to be attached to the main body;
wherein one or more fasteners extending from the base assembly is/are configured to secure the base assembly, and the main body attached thereto, to the display surface.

* * * * *